(12) United States Patent
Thallapally et al.

(10) Patent No.: US 11,318,409 B2
(45) Date of Patent: May 3, 2022

(54) ULTRAMICRO TO MESOPORE FRAMEWORKS FOR SELECTIVE SEPARATION AND STORAGE OF NOBLE GASES

(71) Applicant: BATTELLE MEMORIAL INSTITUTE, Richland, WA (US)

(72) Inventors: Praveen K. Thallapally, Richland, WA (US); John D. Vienna, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 803 days.

(21) Appl. No.: 16/078,502

(22) PCT Filed: Jun. 9, 2017

(86) PCT No.: PCT/US2017/036823
§ 371 (c)(1),
(2) Date: Aug. 21, 2018

(87) PCT Pub. No.: WO2017/218346
PCT Pub. Date: Dec. 21, 2017

(65) Prior Publication Data
US 2019/0091623 A1 Mar. 28, 2019

Related U.S. Application Data

(60) Provisional application No. 62/349,455, filed on Jun. 13, 2016.

(51) Int. Cl.
*B01D 53/02* (2006.01)
*B01D 53/04* (2006.01)
*B01J 20/22* (2006.01)
*F17C 11/00* (2006.01)
*B01D 19/00* (2006.01)
*B01D 59/26* (2006.01)

(52) U.S. Cl.
CPC ..... *B01D 53/0415* (2013.01); *B01D 19/0005* (2013.01); *B01D 53/02* (2013.01); *B01D 59/26* (2013.01); *B01J 20/226* (2013.01); *F17C 11/00* (2013.01); *B01D 2253/204* (2013.01); *B01D 2256/18* (2013.01); *B01D 2257/102* (2013.01); *B01D 2257/104* (2013.01); *B01D 2257/11* (2013.01); *B01D 2257/40* (2013.01); *B01D 2257/504* (2013.01); *B01D 2258/0216* (2013.01); *Y02C 20/10* (2013.01); *Y02C 20/40* (2020.08)

(58) Field of Classification Search
CPC .......... B01D 19/0005; B01D 2253/204; B01D 2256/18; B01D 2257/102; B01D 2257/104; B01D 2257/11; B01D 2257/40; B01D 2257/504; B01D 2258/0216; B01D 53/02; B01D 53/0415; B01J 20/226; Y02C 20/10; Y02C 20/40
See application file for complete search history.

(56) References Cited

U.S. PATENT DOCUMENTS

| | | | |
|---|---|---|---|
| 2003/0106335 A1* | 6/2003 | Golden | B01D 53/04 62/648 |
| 2015/0291870 A1* | 10/2015 | Van Horn | C07F 3/003 252/69 |
| 2016/0151762 A1* | 6/2016 | Fuller | B01D 53/02 502/402 |
| 2016/0193566 A1* | 7/2016 | Karunadasa | B01D 53/685 423/241 |
| 2017/0128910 A1* | 5/2017 | Cooper | B01J 20/2808 |

FOREIGN PATENT DOCUMENTS

WO WO2015198070 * 12/2015 ............. B01D 53/02

OTHER PUBLICATIONS

Bae, Y-S., et al., High xenon/krypton selectivity in a metal-organic framework with small pores and strong adsorption sites, Microporous and Mesoporous Materials, 169, 2013, 176-179.
Banerjee, D., et al., Potential of Metal-Organic Frameworks for Separation of Xenon and Krypton, Accounts of Chemical Research, 48, 2015, 211-219.
Banerjee, D., et al., Metal-organic framework with optimally selective xenon adsorption and separation, Nature Communications, 7:11831, DOI: 10.1038/NCOMMS11831, 2016, 1-6.
Chen, L., et al., Separation of rare gases and chiral molecules by selective binding in porous organic cages, Nature Materials, 13, 2014, 954-960.
Chen, X., et al., Direct Observation of Xe and Kr Adsorption in a Se-Selective Microporous Metal-Organic Framework, Journal of the American Chemical Society, 137, 2015, 7007-7010.
Dorcheh, A. S., et al., Noble gases and microporous frameworks; from interaction to application, Microporous and Mesoporous Materials, 162, 2012, 64-68.
Elsaidi, S. K., et al., Effect of ring rotation upon gas adsorption in SIFSIX-3-M (M = Fe, Ni) pillared square grid networks, Chemical Science, 8, 2017, 2373-2380.

(Continued)

*Primary Examiner* — Christopher P Jones
(74) *Attorney, Agent, or Firm* — Derek H. Maughan; Kristen M. Clark

(57) ABSTRACT

Methods and materials for the selective capture and storage of preselected materials from gas streams using metal organic framework (MOF) materials are described. In various embodiments preselected target material gases could include noble gasses such as Kr, Xe, Rn, An ultramicro to mesopore frameworks for selective separation and storage of noble gases, other gasses such as $I_2$ or other particular isotopes either naturally occurring or man-made, or another preselected gas capture material such as a target material for legal, regulatory or treaty compliance, or a preselected material from a particular process such as a cleaning or etching agent from semiconducting or microelectronic manufacture, or a portion of an anesthetic gas such as nitrous oxide, isoflurane, sevoflurane or a fluorinated ethers.

19 Claims, 16 Drawing Sheets

(56) References Cited

OTHER PUBLICATIONS

Feng, X., et al., Kr/Xe Separation over a Chabazite Zeolite Membrane, Journal of the American Chemical Society, 138, 2016, 9791-9794.
Fernandez, C. A., et al., Switching Kr/Xe Selectivity with Temperature in a Metal-Organic Framework, Journal of the American Chemical Society, 134, 2012, 9046-9049.
Ghose, S. K., et al., Understanding the Adsorption Mechanism of Xe and Kr in a Metal-Organic Framework from X-ray Structural Analysis and First-Principles Calculations, The Journal of Physical Chemistry Letters, 6, 2015, 1790-1794.
Liu, J., et al., Metal-Organic Frameworks for Removal of Xe and Kr from Nuclear Fuel Reprocessing Plants, Langmuir, 28, 2012, 11584-11589.
Liu, J., et al., Enhanced noble gas adsorption in Ag@MOF-74Ni+, Chem Communications, 50, 2014, 466-468.
Liu, J., et al., A Two-Column Method for the Separation of Kr and Xe from Process Off-Gases, Ind Eng Chem Res, 53, 2014, 12893-12899.
Mohamed, M. H., et al., Hybrid Ultra-Microporous Materials for Selective Xenon Adsorption and Separation, Agnew. Chem. Int. Ed., 55, 2016, 8285-8289.
Patil, R. S., et al., Noria: A Highly Xe-Selective Nanoporous Organic Solid, Chem. Eur. J., 22, 2016, 1-7.
Perry, J. J., et al., Noble Gas Adsorption in Metal-Organic Frameworks Containing Open Metal Sites, The Journal of Physical Chemistry C, 118, 2014, 11685-11689.
Ryan, P., et al., Computational Screening of Metal-Organic Frameworks for Xenon-Krypton Separation, AIChe Journal, 57, 7, 2011, 1759-.
Thallapally, P. K., et al., Facile xenon capture and release at room temperature using a metal-organic framework: a comparison with activated charcoal, Chemical Communications, 48, 2012, 347-349.
Van Heest, T., et al., Identification of Metal-Organic Framework Materials for Adsorption Separation of Rare Gases: Applicability of Ideal Adsorbed Solution Theory (IAST) and Effects of Inaccessible Framework Regions, The Journal of Physical Chemistry C, 116, 2012, 13183-13195.
Wang, H., et al., The First Example of Commensurate Adsorption of Atomic Gas in a MOF and Effective Separation of Xenon from Other Noble Gases, Chemical Science, 2013.
Wang, Q., et al., Dynamic separation of Xe and Kr by metal-organic framework and covalent-organic materials: a comparison with activated charcoal, Science China, 2016, doi: 10.1007/s11426-016-5582-3, 1-8.
Xiong, S., et al., A flexible tetrazolate zeolite-like framework with breathing behaviour on Xenon adsorption and separation of noble gases, Journal of Materials Chemistry A., 2013, DOI: 10.1039/x0xx00000x, 1-3.

* cited by examiner

EXTENDED NETWORK

ULTRAMICRO TO MESOPORE FRAMEWORKS FOR SELECTIVE SEPARATION AND STORAGE OF NOBLE GASES

PRIORITY

This invention claims priority from a currently provisional patent application No. 62/349,455, filed Jun. 13, 2016 entitled Separation of Xenon from Air using Hydophobic Metal Organic Frameworks.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The invention generally relates to methods and devices for gas capture and separation and more particularly to devices and methods for noble gas capture and separation.

BACKGROUND

Since their discovery at the end of the 19th century, the noble gases have been the subject of significant interest. Their very low chemical reactivity is unique in the periodic table, and their use in industrial and medical applications such as lighting, medical imaging, semiconductor manufacturing, anesthesia, research and neuroprotection make them a needed and sought after commodity.

Apart from argon, however, noble gases are typically rare. Xenon, for example, occurs in the atmosphere at only 0.087 parts per million by volume, and thus far as proven to be expensive to recover and to purify. As such, high purity xenon can be sold for upwards of $5,000 per kilogram, and applications for the use of xenon have been limited. In addition isotopes and radioisotopes (both natural and man-made) can also pose significant health and environmental risks. Hence a need exists for processes that can separate these materials from the atmosphere or their existing surroundings in energy efficient and in effective ways Some known filter materials such as charcoal, zeolites and activated carbon, have been considered for such applications however, testing on a variety of these items have generally demonstrated a lack of specificity required for more difficult separations, such as separating krypton from xenon, or xenon from air. In addition smaller pores in porous carbons and zeolites can also adsorb the smaller gaseous constituents, such as nitrogen, carbon dioxide, and water, which are present in vastly higher concentrations. This reduces the overall adsorption specificity for the larger noble gas molecules and has rendered these items generally ineffective. Other methodologies for separations such as cryogenic fractional distillation have also been attempted however, this has demonstrated to be an energy intensive and, hence, expensive process.

A physisorption-based separation process using porous materials could provide a long-term viable and cost-effective alternative to cryogenic distillation for separations, enable long terms storage and allow for onsite installation of recycling and re-use processes among other advantages. The present disclosure provides a significant step forward in providing such advantages.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY OF THE DISCLOSURE

The present disclosure includes a method for capturing a preselected target material gas from a mixed gas stream by passing at least a portion of a mixed gas stream over a capture material containing a preselected metal organic framework (MOF) material configured to capture the preselected target gas material, various structures and devices for accomplishing such a method are also disclosed.

In some embodiments the (MOF) is selected from the group consisting of M-ATC, MPyCar, M-SDB, CROFOUR-1-Ni, CROFOUR-2-Ni, PCN-12, MOF-74 series, porous organic cage compounds, and SIFSIX derivatives. The preselected target materials could be a noble gas such as Kr, Xe, Rn, Ar, or particular isotope, either naturally occurring or man-made, or another preselected gas capture material such as Iodine, tritium or a target material for legal, regulatory or treaty compliance, or a preselected material from a particular process such as a cleaning or etching agent from semiconducting or microelectronic manufacture, or a portion of an anesthetic gas such as nitrous oxide, isoflurane, sevoflurane or a fluorinated ethers.

In some applications the capture process takes place in a two-step arrangement wherein a mixed stream gas is passed over a first bed comprising a metal organic framework (MOF) material to generate a filtered gas and then passing said filtered gas over a second bed having a metal organic framework (MOF) material to further capture material and clean the gas stream. In other applications the MOFs described form a system and method for storing a material such as those listed above, including not limited to noble gases, microelectronic processing materials, and anesthetic materials by entrapping the preselected material into a MOF material. In some embodiments that MOF material is included within a container and in some instances the preselected material such as a noble gas is inserted into a container having a preselected MOF material such as M-ATC, M-PyCar, M-SDB, CROFOUR-1-Ni, CROFOUR-2-Ni, PCN-12, MOF-74-M series, M-TCPB, M-BTC, porous organic cage compounds, and SIFSIX derivatives. In various embodiments the capture material for removing the preselected target material from a stream is a MOF material selected from the group consisting of MOF-74 series, M-ATC, M-PyCar, M-SDB, CROFOUR-1-Ni, CROFOUR-2-Ni, M-TCPB, M-Hfbba, SIFSIX derivatives, porous organic cages and PCN-12. In other applications other metal organic framework (MOF) materials may be utilized.

In other applications a storage container is described containing at least one preselected gas capture compound made up of at least one metal organic framework (MOF) material. In some embodiments these preselected gas capture materials are selected from the group consisting of MOF-74 series, M-ATC, M-PyCar, M-SDB, CROFOUR-1-Ni, CRO-FOUR-2-Ni, SIFSIX derivatives, porous organic cages and PCN-12.

While various embodiments have been described it will be clear that the enumerated exemplary list is not wholly inclusive. Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE DISCLOSURE

Figure 1A:
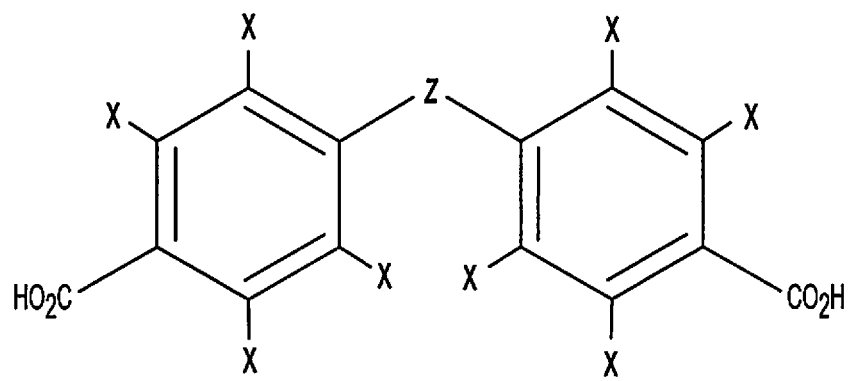
FIG. 1A-1I show the structures of a variety of metal organic framework materials and porous organic frameworks (POFs) that have demonstrated significant utility as gas capture materials for preselected applications.
Figure 1B:
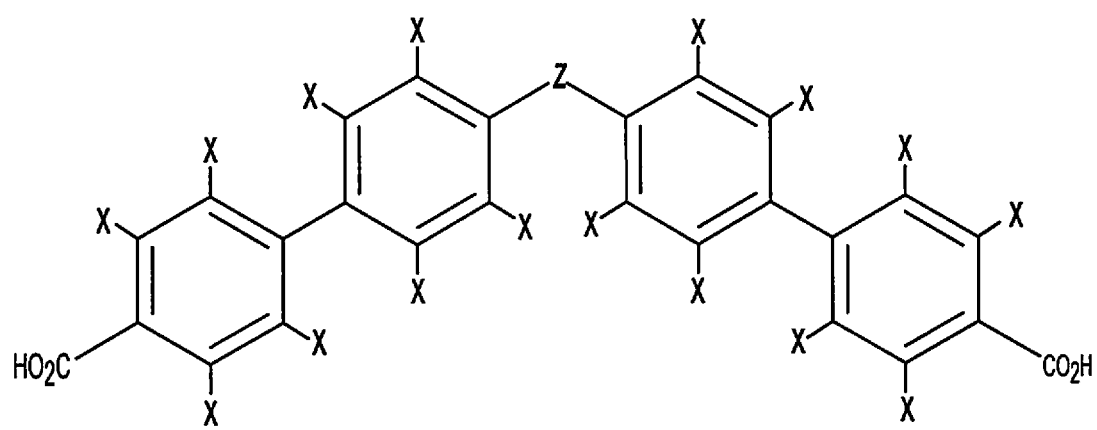
Figure 1C:
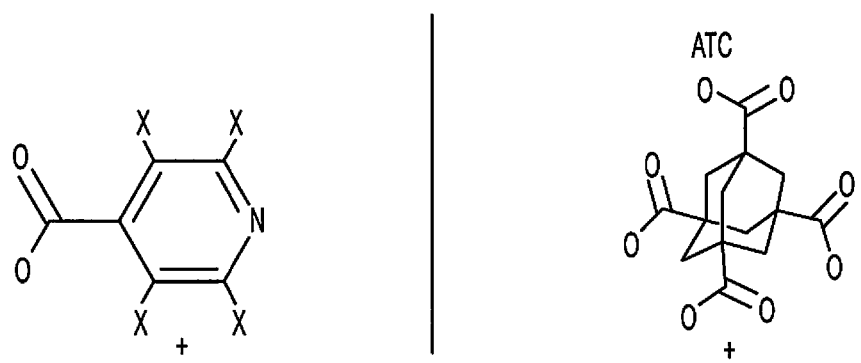
Figure 1D:
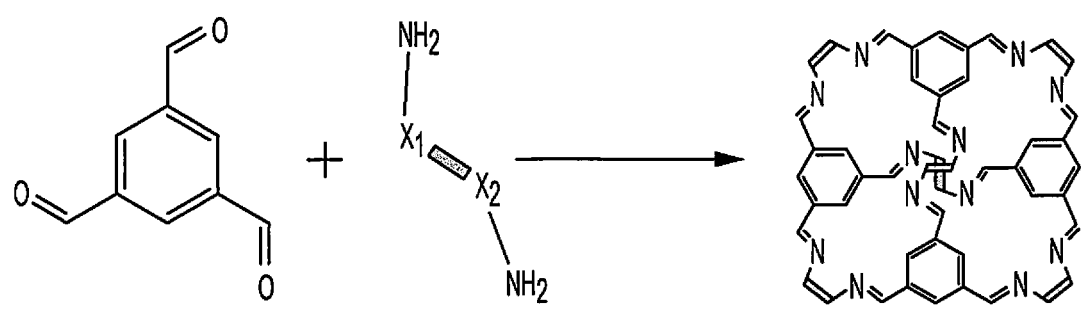
Figure 1E:
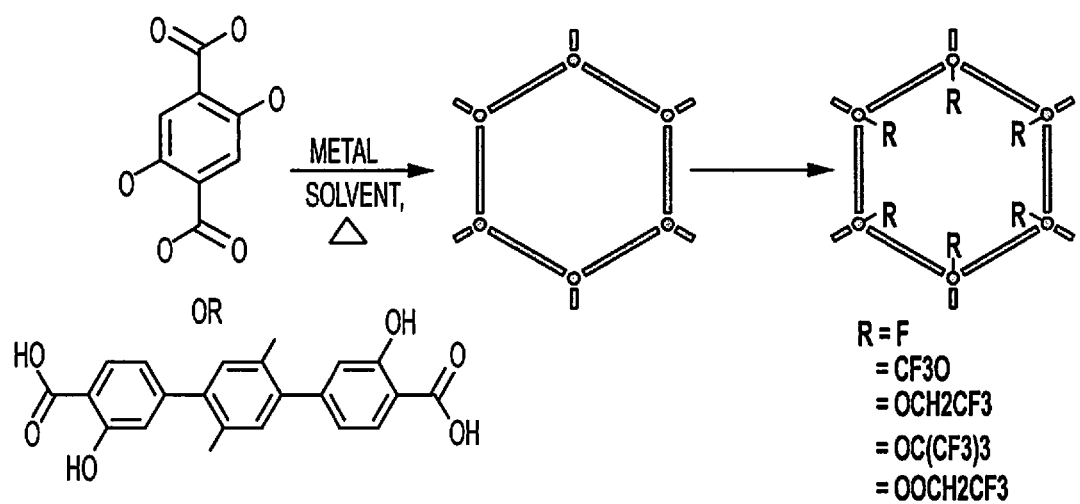
Figure 1F:
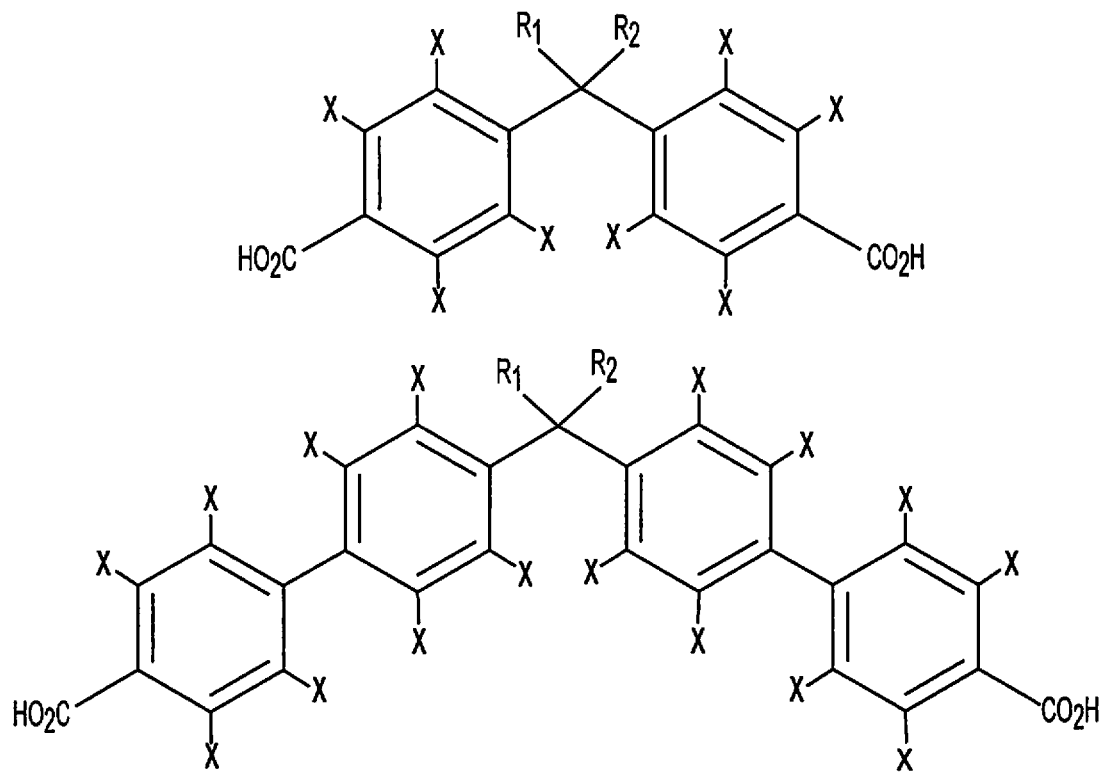
Figure 1G:
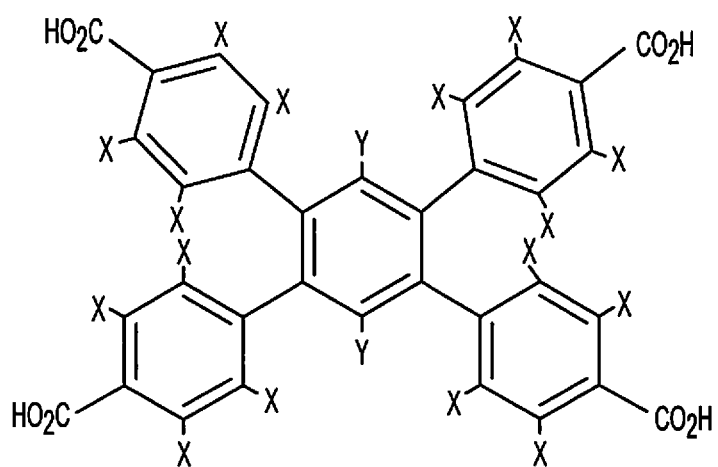
Figure 1H:
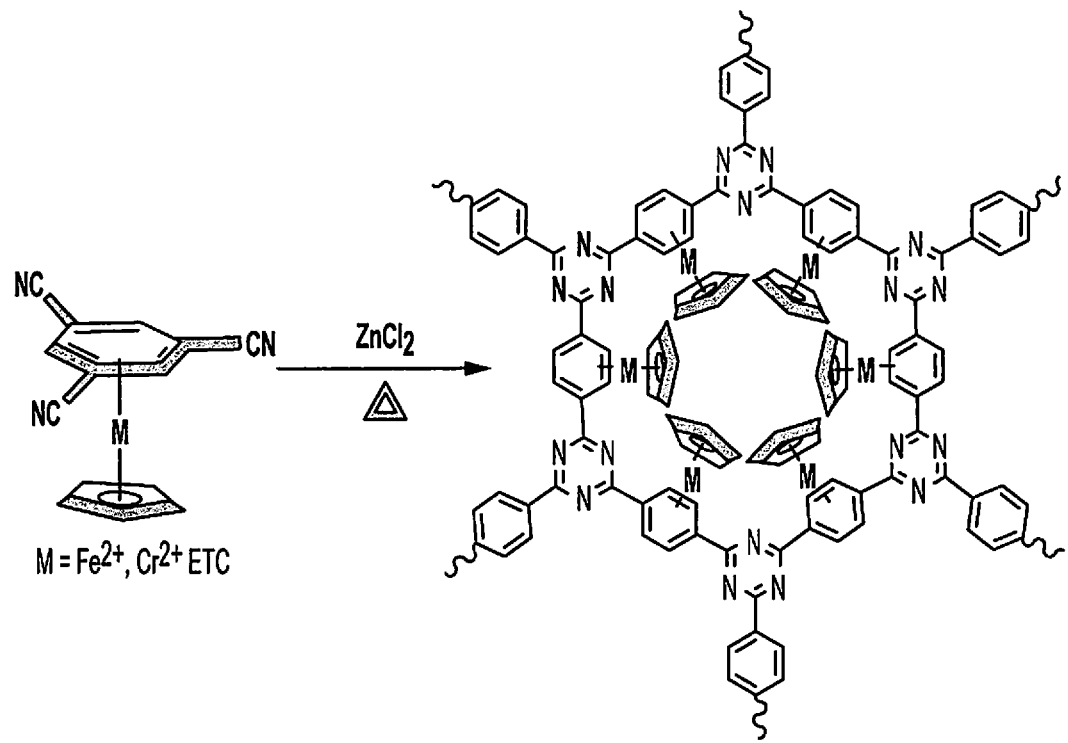
Figure 1H:
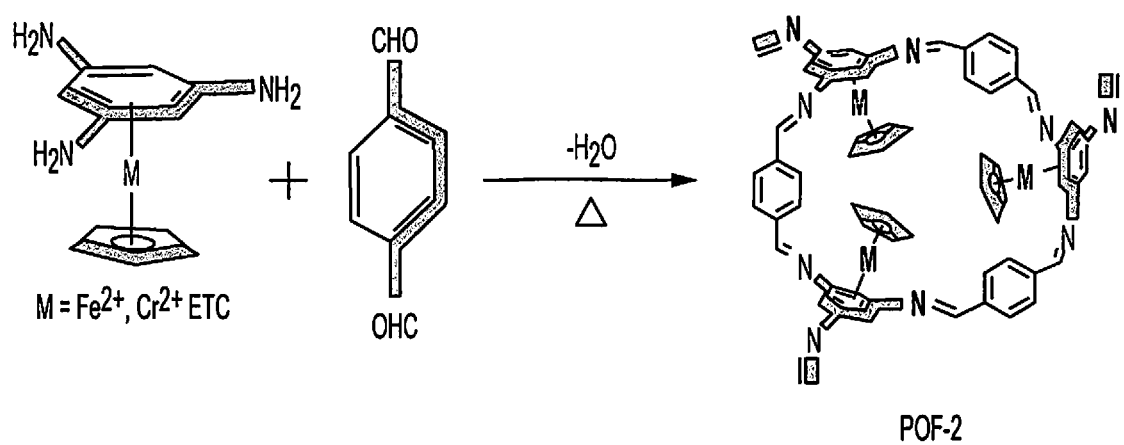
Figure 1I:
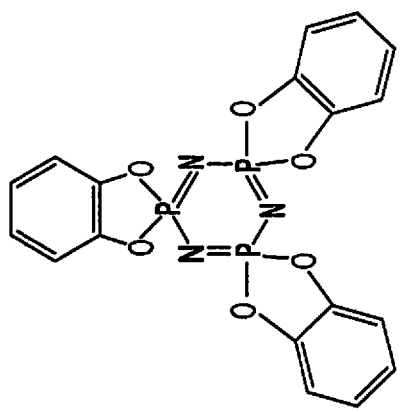

The following description includes various embodiments and examples of the present invention. It will be clear from this description of the invention that the invention is not limited to these illustrated embodiments but that the invention also includes a variety of modifications and embodiments thereto. Therefore the present description should be seen as illustrative and not limiting.

FIGS. 1-6 show a variety of metal-organic framework (MOF) materials and configurations and applications of these materials in various applications. In one set of applications the MOF adsorbents described hereafter were selected or created and tested for pure component Xe and Kr adsorption isotherm at different conditions. Because of their large surface area compared to traditional porous materials such as aluminosilicate zeolites, these MOFs demonstrate characteristics well suited for gas-separation and storage applications and experiments described hereafter demonstrate that Xe can be favourably stored in various MOF materials under ambient and high pressures in ways comparable to and in some cases better than a physical pressurized cylinder. In other applications MOF based adsorbents can enable Xe adsorption and separation applications including fractional distillation at or near room temperature, which is a significantly less energy intense process than the cryogenic distillation processes that have been utilized henceforth.

In a preferred embodiment of the present invention, the metal-organic frameworks (MOFs) are porous metal organic frameworks or hybrid organic-inorganic materials that include at least one metal component selected from the group consisting of Fe, Al, Mg, V, Ni, Mn, Co, Sc, Y, Ti, Zr, Hf, Nb, Ta, Cr, Mo, W, Tc, Re, Be, Ru, Os, Ir, Pd, Pt, Cu, Ag, Au, Hg, Sr, Ba, Ga, In, Tl, Si, Ge, Sn, Pb, Sb, Bi, and combinations thereof with organic building blocks shown in FIGS. 1A-1I and 6 and various combinations thereof. In some embodiments of the present invention, divalent metal ions including $Ni^{+2}$, $Zn^{+2}$, $Cu^{+2}$, $Co^{+2}$, $Mg^{+2}$, $Ca^{+2}$, $Fe^{+2}$, $Cd^{2+}$, $Mn^{+2}$, and the like, and trivalent metal ions such as $Fe^{+3}$, $Al^{+3}$, $Cr^{+3}$, $Mn^{+3}$, and the like, and tetravalent metal ions such as $Zr^{+4}$ and the like are incorporated in the metal organic frameworks. In other embodiments, the porous metal organic frameworks may be formed by coordination with pentavalent or hexavalent metal ions of Ti, Sn, V, W, Mo or Nb with organic building blocks and combination thereof.

In other preferred embodiments of the present invention, along with univalent metals ions, mixed metals containing divalent, trivalent oxidation states are incorporated in metal organic frameworks also known as Prussian blue analogues with chemical formula of $M^{+3}{}_3[M^{+2}(CN)_6]_2$ where $M^{+3}$ can be $Fe^{+3}$, $CO^{+3}$, $Mn^{+3}$ etc. and $M^{+2}$ can be $Zn^{+2}$, $Ni^{+2}$, $Co^{+2}$, $Mn^{+2}$, $Cu^{+2}$ and the like, and mixtures thereof. An organic building block in the porous metal organic framework materials is referred to as a linker or organic linker. In one embodiment, the organic linker has a functional group capable of coordination. Examples of functional groups that can be coordinated with these metal ions include but are not limited to, carbonic acid ($-CO_3H$), anionic form of carbonic acid ($-CO_3-$), carboxyl anion group of carboxylic acid, amino group ($-NH_2$), imino group, hydroxyl group ($-OH$), amido group ($-CONH_2$), sulfonic acid group ($-SO_3H$), anionic form of sulfonic acid ($-SO_3-$), cyanide ($-CN$), nitrosyl ($-NO$) pyridine, and so on. For example, in one embodiment the chemical formula $T[Fe(CN)_5NO]$ where T=Mn, Fe, Co, Ni, Cu, Zn, and Cd; also mixed compositions include $Co_{1-x}T_x[Fe(CN)_5NO]$; T=Mn, Fe, Ni, Zn, and Cd etc. also known as nitroprussides and Prussian blue analogues.

In another embodiment, the organic ligand can be dihydroxyterephthalate and its derivatives. In a non-limiting example this may include, dihydroxyterephthalate having, chloro, bromo, iodo, fluoro, cyano, sulphonato, amino, aldehyde, carbamide and so on. Similarly, organic building blocks can be functionalized with di-, tri-, tetra,-pentaterephthalate containing at least one or more functional groups such as nitro, amino, bromo, chloro, iodo, amino and so on (FIG. 1A-1I). In one embodiment, porous metal organic framework materials having chemical formula $M_3X(H_2O)_2O[C_6Z_{4-y}Z'_y(CO_2)_3]$ (M=Cu, Fe, Ca, Mg, Zn, Ni, Cr, Mn, V, Al, Mg, Ca, Ti; X=Cl, Br, I, F, or OH; Z or Z'=H, $NH_2$, Br, I, $NO_2$ 0<y<4) or a hydrate may be utilized. Other embodiments of the porous metal organic framework of chemical formula include $M_3X(H_2O)_2O[C_6Z_{3-y}Z'_y(CO_2)_3]_2$ (M=Cu, Fe, Zn, Ni, Cr, Mn, V, Al, Mg, Ca, Ti; X=Cl, Br, I, F, or OH; Z or Z'=H, $NH_2$, Br, I, $NO_2$ 0<y<4). Other molecular formulas represented as $M_3OX_{1-y}(OH)_y[C_6H_3-(CO_2)_3]_2$ (0<y<1; M=Cu, Fe, Mn, Cr, V, Al, Ti, Zr, or Mg, X=Cl, Br, I, F, $NO_2$, $NH_2$, CHO. $M_3X_{1-y}(OH)_y(H_2O)_2O[C_6H_4(Co_2)_2]_3$; (0<y<1; M=Cu, Zn, Al, Mg, Fe, Ge, Ru, Rh, Mn, Ni; X=Cl, Br, I, F, etc). Another chemical formula of porous metal organic frameworks with hydrate is represented as $M_3O(H_2O)_2X_{1-y}(OH)_y[C_6H_3-(CO_2)_3]_2 \cdot nH_2O$ (0<y<1; (M=Cu, Fe, Mn, Cr, V, Al, Ti, Zr, or Mg, X=Cl, Br, I, F, NO=, $NH_2$, CHO, 0.1<n<150) $M_3X_{1-y}(OH)_y(H_2O)_2O[C_6H_4(CO_2)_2]_3 \cdot nH_2O$ (M=Cu, Fe, Mn, Cr, V, Al, Ti, Zr, or Mg, X=Cl, Br, I, F, $NO_2$, $NH_2$, CHO, 0.1<n<150).

Referring first to FIG. 1 A one embodiment of a MOF liker is shown wherein X is a material selected from the group of H, F, Cl, Br, OH, SH and combinations thereof, and Z is SO2, SO, C, or O. When combined with a metal resulting example embodiments showed good performance for Xe separation. FIG. 1B shows another set of linkers wherein X is selected from the croup of H, F, Cl, Br, I OH, SH or combinations thereof and Z is SO2, SO, S, C, or O. FIG. 1 C shows the best candidate for MOFs for Xe separation when linkers and metals are utilized. In these embodiments X is H, F, Cl, Br, I or CH3, and is connected to a transition metal such as Zr. In another embodiment the structure shown in FIG. 1 forms a linkage between ATC (adamantane tetracarboxylicacid) and any metal including but not limited to transition metals. FIG. 1 D shows the pieces for combination to form a porous metal cages wherein the interconnections between X1-X2 is CH2, SH, CF2, CH(CH$_3$), C(CH$_3$)$_2$, other functional groups including a cyclo hexane or combinations thereof.

These materials form a variety of ultra and small pore (0.3 nm to 7 nm), low to moderate surface area (100 to 700 m$^2$/g) metal organic framework and porous organic frameworks (MOF and POF structures and their various embodiments. These structures include M-SDB (M=any transition metals, Mg, Ca, Na, Li, Zr, Hf, U etc.; SDB=4,4'-sulfonyldibenzenzoic acid or extended sulfonyldibenzoic acid derivatives) such as the examples shown in FIGS. 1A and 1B; M-PyCar (PyCar=Pyridene-4-carboxylic acid and its derivatives, M=any transition metals, Ca, Mg, Na, Li, Zr, Hf, etc), FIG. 1C; M-ATC (ATC=adamantane tetracarboxylicacid; M=M=transition metals, Ca, Mg, Na, Li, Zr, Hf, etc) FIG. 1C, CC3 (CC=cage compound or POF) FIG. 1D, SIFSIX-M derivatives (SIFSIX=SiF$_6$=Silicon hexafluoride based MOFs, M=transition metal) FIG. 1E, MOF-74 (Metal (transition metals) coordinated with dioxobenzenedicarboxylic acid and extended dioxobenzenedicarboxylic acid derivatives) FIG. 1F, M-hfbba derivatives [M=any transition metals, Mg, Ca, Na, Li, Zr, Hf, U etc; hfbba=4, 4'-(Hexafluoroisopropylidene)bis(benzoicacid) and its extended derivatives], FIG. 1G M-TCPB (M=any transition metals, Mg, Ca, Na, Li, Zr, Hf, U etc; TCPB=1,2,4,5-Tetrakis(4-carboxyphenyl)benzene) X is H. F. Cl. Br, I OH, SH or combinations thereof R1 and R2 are CH3, CF3, NH2, Cl, Br, F, I and combinations thereof, FIG. 1H and ferrocene functionalized POFs (wherein X is H, F, Cl, Br, I CH3, or combinations thereof and Y is CH3 or other long alkyl chains. See FIG. 1I and FIG. 1I and associated metal (e.g. Silver, Palladium, Copper, etc.) nanoparticles and metal cations incorporated within the pore space of MOF materials. In additions to these specific examples a variety of other embodiments with materials of similar characteristics are also contemplated.

A series of column break through experiments were performed on various samples of these materials wherein columns of these various MOFs were exposed to a gas mixture consisting of 400 ppm Xe, 40 ppm Kr, 21% O$_2$, and the balance N$_2$ at room temperature. Under these condition the retention time of Xe proved to be longer than other gases in the air which indicate that the aforementioned MOFs can effectively capture and separate Xe from gas mixture. Table 1 shows the Xe, Kr equilibrium capacity from breakthrough experiments for MOFs. The results of these experiments show that particularly, M-ATC (M=any transition metals; ATC=adamantane tetracarboxylic acid) and M-PyCar (M=any transition metals; PyCar=4-pyridene carboxylic acid) were found to be 32 mmol/kg surpassing that of NiDOBDC MOF (4.8 mmol/kg), CaSDB (13.2 mmol/kg), SIFSIX-Fe (8.12 mmol/kg) and porous organic cage (11 mmol/kg).

TABLE 1

| Material | Xe capacity[1] (mmol/kg) | Kr capacity[1] (mmol/kg) | Xe/Kr Selectivity[1] |
|---|---|---|---|
| MPyCar | 35 | 0.25 | 10.23 |
| Cu-ATC | 32 | 0.38 | 6.53 |
| CaSDB | 13.2 | 0.087 | 15.17 |
| CC3 | 11 | 0.055 | 20.4 |
| SIFIX-Fe | 8.12 | 0.19 | 4.27 |
| NiMOF-74 | 4.8 | 0.066 | 7.27 |

In other experiments CaSDB was tested under different activation temperatures (373 K and 563 K) and pressures. While total Xe uptake at 1 bar remained similar under different activation temperatures, at lower pressures the adsorption behaviour was very different. CaSDB activated at 373K adsorbed ~2.5 times more Xe at 30 mbar than the CaSDB sample activated at 563K. In both cases, the Xe uptake capacity (at 30 mbar) surpassed the Xe uptake capacity of other MOFs such as benchmark MOF-74 and CC3. In other experiments the uptake of Xe Qst was found to be ~35 kJmol$^{-1}$ (Kr Qst~26 kJ mol$^{-1}$) one of the highest among the inorganic-organic hybrid materials and organic cages. The Xe capacity at low pressure and the high Xe Qst value means M-SDB (M=any transition metal, Ca, Mg, Cd, Na etc) can be an excellent candidate for Xe adsorption separation at nuclear reprocessing conditions (400 ppm Xe, 40 ppm Kr, balance air) and have excellent Xe/Kr separation performance as evident from the breakthrough experiments. Interestingly, CaSDB retains its Xe uptake capacity in presence of 48% relative humidity under breakthrough condition. The Xe uptake of CaSDB is higher than benchmark CC3 (11 mmol/kg) and NiMOF-74 (4 mmol/kg) under similar breakthrough conditions. Majority of the zeolites and carbons does not capture Xe when other competing gases are present particularly CO$_2$ and water vapor, Except M-SDB and M-PyzCar based MOFs can selectively capture even in presence of CO$_2$. M-SDB based MOFs can capture even in the presence of water vapor.

Single crystal XRD studies on CaSDB revealed that each Xe was adsorbed at a single site, near the midpoint of the channel, interacting with the channel wall (aromatic rings) by mainly van der Waals type interactions. The position of Xe in the pore is consistent with calculated potential energy contours and molecular simulations of Xe adsorption. The saturation loading of Xe approaches two atoms per unit cell, consistent with commensurate Xe adsorption. Such commensurate adsorption in CaSDB was previously observed in case of small hydrocarbon molecules ($C_2$-$C_3$), which occurs when the adsorbed amount, location, and orientation of an adsorbate are commensurate with the crystal symmetry of the adsorbent.

Another microporous variant of CaSDB series is CaTCPB, has a calcium metal center and a tetrahedral organic linker tcpb, 1,2,4,5-tetrakis(4-carboxyphenyl)-benzene (TCPB), forming diamond shaped channels of approximate diameter 7 Å×7 Å. An activated SBMOF-2 adsorbs 2.83 mmol/g of Xe vs. 0.92 mmol/g Kr at 298K and 1 bar. The total Xe uptake is lower than that of NiMOF-74 and Ag@NiMOF-74 but higher than other MOFs such as CaSDB, CC3 and cobalt formate. Moreover, CaTCPB does not possess any open metal site and has outstanding air and moisture stability in line with CaSDB. The Xe/Kr separation is also confirmed by both experimental and simulated breakthrough, which exhibit preferable adsorption and selectivity towards Xe over Kr. The single crystal XRD data on Xe and Kr loaded CaTCPB show that the Xe selectivity may be attributed to the specific geometry of the pores, forming cages built with phenyl rings and enriched with polar-OH groups, both of which serve as strong adsorption sites for polarizable Xe gas.

SIFSIX-M (SIFSIX=$SiF_6$, $TiF_6$ etc, M=Fe, Co, Ni, Cu, Zn and coordinated with pyrazine) are a series of benchmark hybrid ultra-microporous materials (HUMMs) with isoreticular structures based on square grid sheets $(M(pyz)_2]^{2+}$ (pyz=pyrazine), connected by pillaring $SiF_6^{2-}$ anions. Experimentally, all five materials showed preferential Xe adsorption over Kr at 1 bar and 298K, with their order of uptake roughly following their surface area. For example, the —Zn, —Cu and —Co analogues show lower Xe overall uptake at 1 bar compared with the Ni and Fe analogues. The total Xe uptake for Fe— and Ni— analogue was found to be similar because of their similar surface area. The Fe-analogue exhibits the highest Xe Qst (-27.4 kJ $mol^{-1}$) at zero loading, higher than all other analogues. Column breakthrough experiment under simulated nuclear reprocessing conditions (400 ppm, 40 ppm Kr, balance air) was further conducted on SIFSIX-Fe analogue, which reveal that SIFSIX-Fe can preferentially adsorb Xe over other gases.

Xe uptake capacity of SIFSIX-Fe under nuclear reprocessing conditions surpass that of MOF-74 Ni (4 mmol/kg) but is lower than CC3 (11 mmol/kg) and CaSDB (13.2 mmol/kg). While all the SIFSIX-M (M=Fe, Co, Cu, Zn) analogue show typical type-I Xe adsorption isotherm, the Ni-analogue on the contrary showed a two-step adsorption isotherm for Xe a with temperature dependent inflection point. The location of the adsorbed Xe within the structures of SIFSIX-3-Ni was determined with in situ synchrotron-based PXRD. The Xe adsorbate resides in the center of the channel with its $C_\infty$ axis aligned with $C_4$ axis of the crystal lattice=with only a slight expansion of both a/b and c-axis lattice parameters upon Xe binding.

CROFOUR-1(2)-Ni belongs to previously described HUMM family of materials, formed by a pillaring square grid sheets $[Ni(L)_2]^{2+}$, [L=1,2-bis(4-pyridyl)ethylene or 4,4'-azopyridine], connected by $CrO_4^{2-}$ as an angular inorganic pillar with a mmo type topology. CROFOUR-1-Ni and CROFOUR-2-Ni, possess two distinct types of microspores: one is decorated by six oxygen atoms from the inorganic linkers (two from each $CrO_4^{2-}$ moiety); the second is lined by the functionalized organic linker (N═N from 4,4'-azopyridine or C═C from 1,2-bis(4-pyridyl)ethylene). Both materials in their activated conditions show more affinity towards Xe than Kr with CROFOUR-1-Ni having a Qst of 37.4 kJ $mol^{-1}$ at zero loading, the highest reported till date.

To further investigate the potential of these materials under dynamic conditions, column breakthrough experiments were conducted at 298 K for Xe/Kr gas mixtures on CROFOUR-1-Ni and CROFOUR-2-Ni. The separation times between Xe and Kr gases for the 20:80 gas mixture were found to be 39 and 32 min/g for CROFOUR-1-Ni and CROFOUR-2-Ni, respectively. These results indicate that these HUMs efficiently adsorb and separate Xe gas with high selectivity. Ideal adsorbed solution theory (IAST) was used to predict the selectivity of Xe/Kr binary mixtures based on the experimental single adsorption isotherms collected at 298 K. Selectivity at 298 K and 1 bar were calculated to be 26 and 16 for a 50:50 Xe/Kr binary gas mixture, 22 and 15.5 for a 20:80 Xe/Kr mixture and 21.5 and 15 for 10:90 Xe/Kr for CROFOUR-1-Ni and CROFOUR-2-Ni respectively.

Molecular simulation supported by in-situ synchrotron powder XRD studies revealed that the primary adsorption site for Xe in both materials is located in the cage that contains three $CrO_4^{2-}$ ions in proximity to each other. Xe atoms interact with six terminal oxygen atoms simultaneously: two each from three different $CrO_4^{2-}$ moieties). In both cases, the pore size is slighter larger than the kinetic diameter of Xe and provides a favourable fit for the adsorbed Xe atoms. The primary adsorption site for Kr in both materials is the same as that for Xe. However, interactions between Kr and the moieties at this site in both materials are weaker, presumably due to the smaller polarizability of Kr.

Examples of other organic molecules that possess intrinsic porosity have shown selective Xe adsorption, owing to the close pore size Xe matching. For example, Tris(o-phenylenedioxy)cyclo-triphosphazene (TPP), FIG. 1J, a zeolite-like material with a pore diameter of 4.5 Å, can absorb 1.7 mmol/g Xe at 298 K and 1 bar. CC3 is an organic cage molecule with an internal cavity. In the solid state, CC3 packs such that the internal cage cavities are connected via four cage windows, which form the narrowest point in the resulting in a diamondoid pore network of internal diameter of 3.6 Å. CC3 shows selective Xe adsorption over other gases, especially Kr with a saturation uptake of 2.2 mmol/g at 1 bar and 298K.

Figure 2:
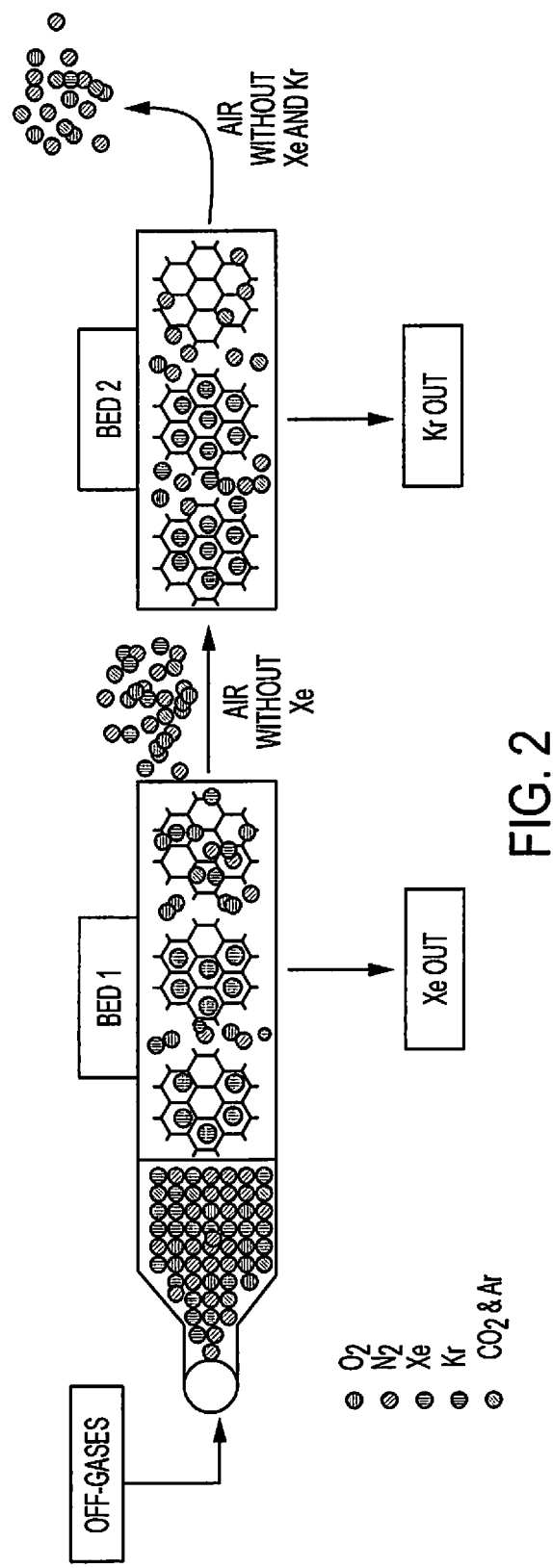
FIG. 2 shows is a plan view of an arrangement for two stage gas capture.

Breakthrough measurement at simulated nuclear reprocessing condition (400 ppm Xe, 40 ppm Kr, balance air) on CC3 record a Xe uptake capacity of 11 mmol/kg, higher than benchmark MOF-74 (4 mmol/kg) but lower than CaSDB (13.2 mmol/kg) under similar experimental conditions. However, CC3 does exhibit a higher Xe/Kr selectivity than CaSDB (20.4 vs. 16), as calculated based on the experimental data. Crystallographic experiment reveals that the Xe atom almost perfectly fits within the cage, closely interacting with the side walls. The studies performed show that as the total pressure increases, that the Xe/Kr selectivity decreases and that the smaller Kr atom adsorbs more preferentially at higher pressures. Because Xe is more polarizable than Kr, many of the materials tested for non-cryogenic separation of Xe and Kr are Xe-selective. However, for Xe capture during used nuclear reprocessing, Kr selectivity is also important because of the longer half-life of Kr compared to Xe. A combinatorial approach that engages multiple solid state adsorbents to separate and capture Xe and Kr from the flue gas stream has been devised. As shown in FIG. 2, a two-bed capture system approach can be applied to enhance the total amount of Kr adsorption. In this approach, a gas-mixture with composition similar to nuclear reprocessing condition is passed through two solid state adsorbent materials, such as the MOFs described above connected in a series. The Xe selective material in the first bed will absorb the Xe from the gas-mixture under dynamic conditions. The solid state adsorbent in second bed will be able to adsorb a higher amount of Kr in absence of Xe gas to compete for adsorption sites.

In one set of the experiments, two benchmark MOFs, MOF-74 and M-hfbba were used in combination in a two bed system such as the one shown in FIG. 2, at 233K and under conditions pertinent to used nuclear reprocessing off-gases. Both materials showed significant enhancement of Kr uptake in the 2nd bed compared to the first bed. For MOF-74 and M-hfbba, Kr uptake was enhanced by a factor of 2.5 and 3.7, respectively, in the 2nd bed (0.61 mmol/kg vs. 0.24 mmol/kg and 1.03 mmol/kg vs. 0.28 mmol/kg). This is believed to have occurred because of a reduction in the presence of competing Xe atoms in the 2nd bed, so that more adsorption sites are available for the Kr adsorption. This enhancement in adsorption can be further increased by using different materials, including those screened for desired pore sizes and charge capabilities and pairings of mutually assistive gas capture and removal to obtain optimized solid-state adsorbent combination removal materials for both beds.

In another set of experiments high surface area materials with interconnected small (4 to 6 nm) and large pores (>6 nm) porous materials including PCN-12 or M-TCDPM (M=any transition metals, Ca, Mg, etc; TCDPM=3,3',5,5'-tetracarboxydiphenylmethane) with its high gravimetric internal surface was tested and compared against other benchmark MOFs MOF-74, M-BTC (M=any transition metals; BTC=benzene tricarboxylic acid), M-SDB, and M-Py-Car MOFs in a packed column arrangement wherein a feed replicating an anesthetic gas mixture (65% Xe, 24% $O_2$, 6% $N_2$ and 5% $CO_2$) was fed through the packed column in order to evaluate the likelihood of employing these materials for practical application including semiconductor, MEMS and medical applications as Xenon recovery and recycle. The results of the testing of these materials is shown in Table 2.

TABLE 2

|  | PCN-12 | CuBTC | MOF-74Ni |
|---|---|---|---|
| Surface area | 2700 | 2014 | 1143 |
| Xe capacity at 1 bar and 298K (mmol/g) * | 5.12 | 4.33 | 4.25 |
| Xe capacity at 0.65 bar and 298K (mmol/g) * | 3.7 | 3.01 | 3.5 |
| Xe Capacity at breakthrough time (mmol/g) | 4.4 | 3.62 | 2.62 |
| Xe/$CO_2$ selectivity¶ | 1.99 | 2.3 | 0.34 |
| Xe/$N_2$ selectivity¶ | 18.46 | 19.6 | 1.86 |
| Xe/$O_2$ selectivity¶ | 18.25 | 19.1 | 2.02 |

¶Selectivity calculated from breakthrough experiments at 1 bar and 298K for 65% Xe, 24% $O_2$, 6% $N_2$ and 5% $CO_2$ gas mixture.
*Capacity from the pure gas adsorption isotherms.
Selectivity at room temperature using gas mixtures similar to semiconductor, MEMS and medical anesthetic gas.

In another set of experiments the recapture ability of an anaesthetic gas using various described materials was explored. A column packed with these three materials was fed with an anaesthetic gas mixture at room temperature with flow rate of 5 ml/min and total pressure of 1 bar. Xe is retained by all three adsorbent materials while $N_2$ and $O_2$ gases were quickly broke through the column. PCN-12 showed the highest performance of Xe recovery from anaesthetic gas mixture. The calculated capacity of adsorbed Xe at equilibrium by PCN-12 was found to be 4.9 mmol/g whereas 4.7 and 4.2 mmol/g for CuBTC and MOF-74Ni respectively. These results demonstrate the feasibility of various MOFs for efficient and portable Xe recycling and recovery device that separate and capture Xe from anaesthetic gas mixture at ambient condition. Further in-situ synchrotron measurements suggest, the Xe prefers to bind smaller pockets. A closed system containing MOF material as a sorbent for portable breathing units for medical industry provides an opportunity to recycle and reuse Xe efficiently that offers distinct cost-advantage for the widespread use of Xe as new source of anaesthetic gas. An example of how such a system would operate is shown in FIG. 3.

Figure 3:
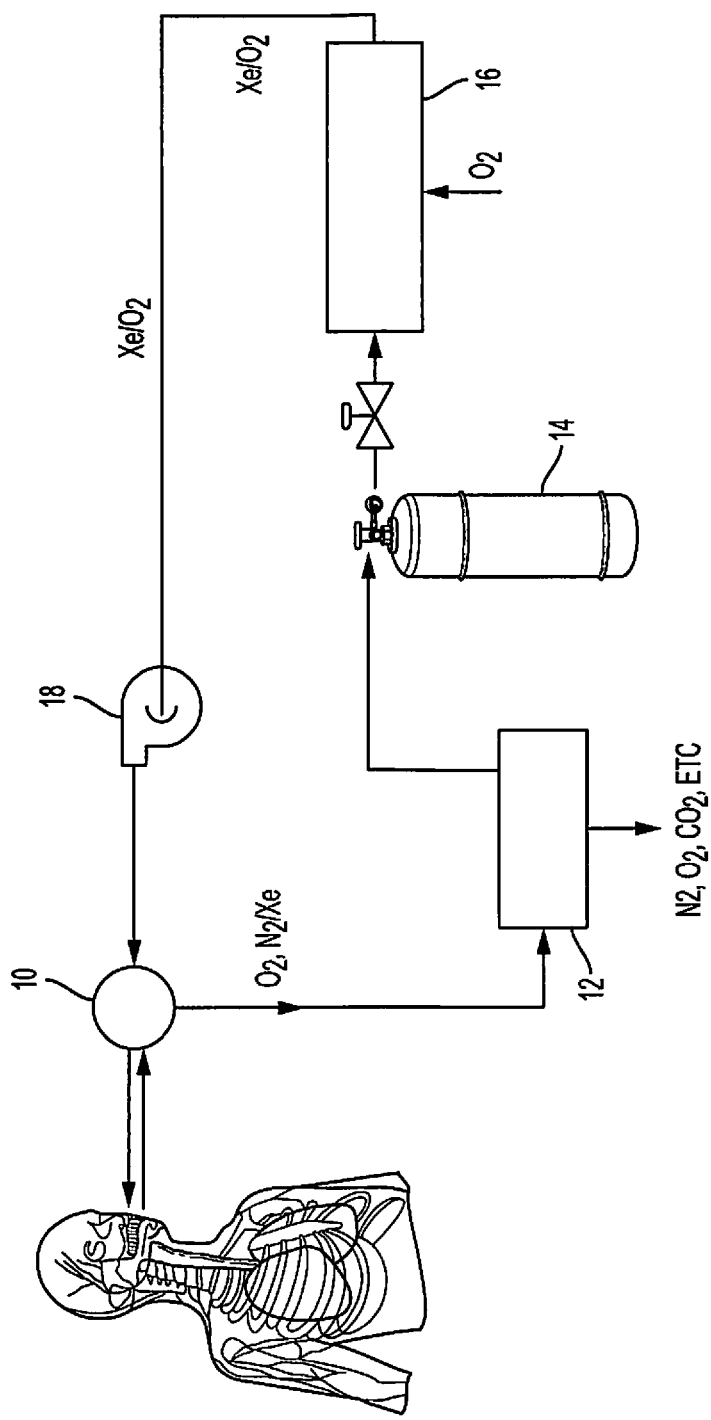
FIG. 3 is a process diagram for the collection and recapture of Xe in an anaesthetic gas application.

Referring now to FIG. 3 and example of the present embodiment is shown wherein a patient is presented with an anaesthetic gas mixture through a breathing apparatus. The patient then inhales the mixture into their lungs and exhales a mixture of metabolic gasses and unused anaesthetic gasses. In a typical arrangement this exhaled portion could include gasses such as $O_2$, $CO_2$, $N_2$, Xe and other gasses. This exhaled portion is then transported to a separation bed 12 containing a series of preselected MOF materials, such as those described in this application. These MOF materials then selectively remove target materials and allow non-target gasses such as $O_2$, $CO_2$, $N_2$, Water etc, out of the system. A MOF release process, such as vacuum swing desorption or other similar technique is then used to separate the target material such as Xe from the MOF material in the MOF bed and this recaptured target material is then stored for example in a storage device 14 for later use or recycled by mixing with for example oxygen in a mixing chamber 14 to form an anaesthetic gas mixture that can be recycled and pumped (by a pump 18) back into the breathing apparatus 10 wherein the anaesthetic gas can be inhaled and used by the patient. In another set of experiments various MOF materials including, M-SDB, M-ATC, M-BTC, M-PyCar, PCN-12 or M-TCDPM (M=any transition metals, Ca, Mg, etc; TCDPM=3,3',5,5'-tetracarboxydiphenylmethane) can be used to recycle and reuse other anaesthetic gases including nitrous oxide, isoflurane, desofluorane and sevoflurane in a packed column arrangement wherein a feed replicating an anesthetic gas mixture containing above gases balanced with $N_2$, $O_2$ $CO_2$ and trace amount of water vapor was fed through the packed column in order to evaluate the likelihood of employing these materials for recycle and reuse of the above anaesthetic gases.

Figure 4:
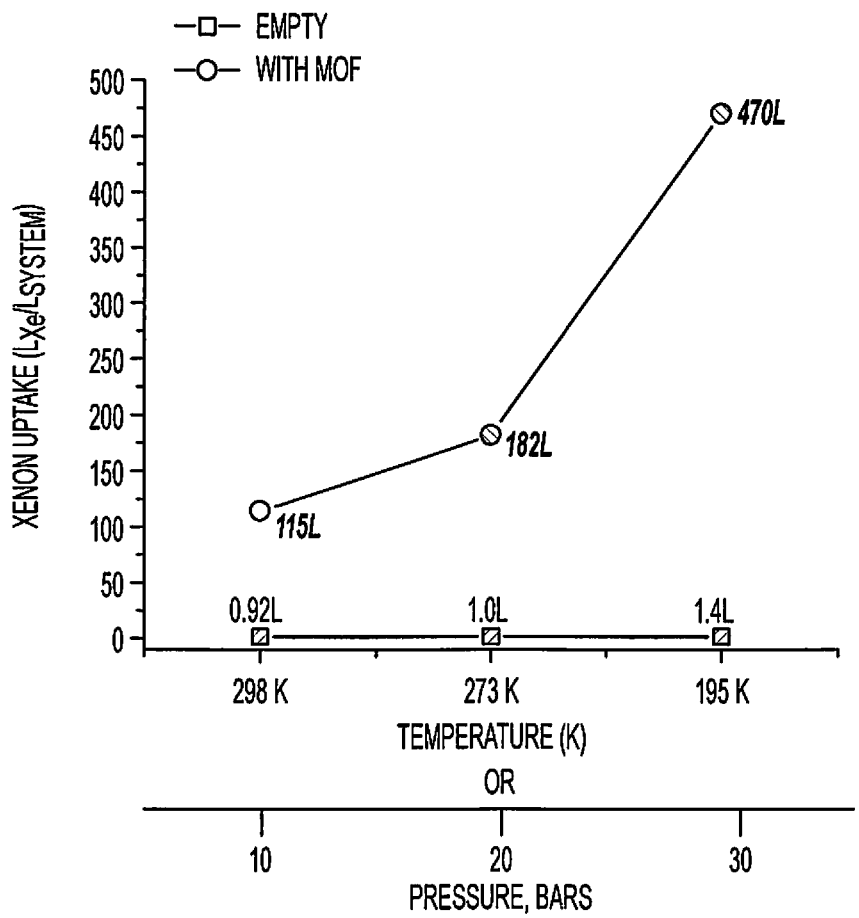
FIG. 4 is a chart showing the efficacy of Xe uptake and storage in a container containing MOFs compared to a standard pressurized container either at low temperature or high pressure.

FIG. 4 shows the increased efficiency of target gas storage that can be obtained using MOFs such as those described in the present application in a storage system. In one set of experiments a series of uptake experiments were undertaken which show that the MOFs increase the capture of Xe in a system significantly. These results demonstrate that a 1 liter cylinder filled with MOFs specific for Xe enables the same amount of Xe to be held in that cylinder at 1 atm as a 336 liter tank without any MOFs under the same conditions.

Figure 5:
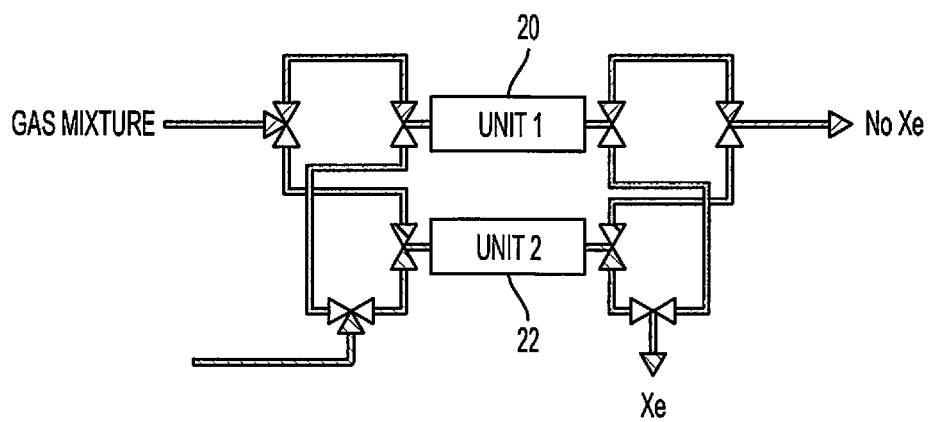
FIG. 5 is a Xenon, recycle and reuse methodology from gas mixtures arising from semiconductor and related manufacturing.

In another set of experiments a system, shown in FIG. 5, was deployed wherein MOFs produced using organic buildings block and combinations thereof that were capable of coordination with various metals were packed into a column wherein a feed replicating an semiconductor and related manufacturing gas mixture ($H_2O$, $O_2$, $CO_2$, Xe, $CF_4$ and N2) was passed through a MOF Unit 1 20 at applicable temperatures and pressures to alternatively adsorb a preselected material such as Xe on to a MOF bed to remove the Xe from a gas stream then to desorb the captured Xe into a second stream that is further passed on to a second bed 22 where it is concentrated and then selectively released for recycle and reuse. This system and process for the collection, concentration and desorption of selected materials from the gas mixture onto and off of the MOF beds can find likely deployment in practical applications including semiconductor, MEMS and medical applications as Xenon recovery and recycle.

In another set of experiments CaSDB and CuATC, NiPy-Car were found to be good candidates for Xe/Kr separation at room temperatures. In a first set of experiments, single column breakthrough experiments were performed at room temperature using CaSDB and CuATC with a gas mixture consisting of 1300 ppm Xe, 130 ppm Kr, 78% $N_2$, 21% $O_2$, 0.9% Ar, and 300 ppm $CO_2$ to calculate the co-adsorbed species. In two separate experiments, both MOFs (1 gram of CaSDB and 0.7 grams of CuATC) were packed in a column activated under He flow at 100° C. for a period of 12 hours. Both columns containing MOFs were cooled down to room temperature and the gas mixture consisting of 1300 ppm Xe and 130 ppm Kr balanced with air was injected at a flow rate of 10 and 20 ml/min. The gases exiting the column were monitored using a mass spectrometer as a function of time. All the gases, including $N_2$, $O_2$, Ar, and Kr, underwent breakthrough of the column immediately after introducing the gas mixture. However, $CO_2$ took several minutes to exit the column, indicating the selectivity of $CO_2$ over $N_2$, $O_2$, Ar, and Kr by CaSDB. Xe retention in the column was much longer than the other gases, including $CO_2$. Under these conditions, the Xe capacity at equilibrium was found to be 35 mmol/kg.

In large scale gas separation, the separation typically must be stopped before the gas breaks through. Therefore the breakpoint time gives the "usable" capacity in the column experiments. Capacities of all co-adsorbed gases at breakthrough time for CaSDB are provided in Table 3, and the selectivity for Kr in such an arrangement are shown in FIG. 5. Capacities of co-adsorbed gasses at breakthrough time for MOF-11 are provided in Table 4. Similar experiments were performed with NiPyCar using 20 ml/min using the same gas mixture at room temperature. The Xenon capacity at these conditions is 75 mmol/kg, almost 3× higher than CaSDB and close to CuATC MOF. However NiPyCar is better than CuATC in terms of Xe/$CO_2$, which is 6 for NiPyCar whereas for CuATC is 0.45 and CaSDB is 3. A significant improvement in terms of selectivity and capacity for NiPyCar.

In another experiment, single component gas adsorption isotherms for Xe were collected at different temperatures 298 K. The PCN-12 reveals the high affinity towards Xe compared to CuBTC and MOF-74 Ni. Under these conditions, none of the MOFs were reached a saturation therefore Xe adsorption experiments were conducted on all three MOFs at low temperatures at RT. At 195K, PCN-12 and CuBTC has a steeper uptake compare to MOF-74 Ni, an almost 2 to 3 times higher Xe capacity than MOF-74Ni. This can be attributed to the high surface area of CuBTC and PCN-12 compare to MOF-74 Ni. Similarly, CuBTC shows slightly better Xe uptake at low pressure region (0-0.1 bar) than PCN-12. The Xe capacity at 195K for MOF-74Ni, CuBTC and PCN-12 was found to be 8, 18.0 and 21.4 mmol/g, respectively. PCN-12 surpasses both MOF-74Ni and CuBTC at 1 bar pressure.

Under identical condition (195K and 1 bar), the Krypton (Kr) capacity in PCN-12 was found to be 11.8 mmol/g (265 cc STP/g), which is 50% lower than Xe capacity (478 cc STP/g; 21.4 mmol/g) under identical condition which reveals a great potential of this material for practical Xe storage and separation applications at low temperature (FIG. 4). The Xe density within the pores of all three MOFs were calculated to be in the range of 500-1150 kg/$m^3$ at room temperature and 2100-2700 kg/$m^3$ at 195K, which is close to the liquid Xe density at boiling point (2900 kg/$m^3$).

TABLE 3

| Gas | Breakthrough Time (min) | Capacity (mmol/kg) | Selectivity of Xe |
|---|---|---|---|
| Xe | 18 | 16 (33.8)$^a$ | |
| Kr | 1 | 0.11 (0.75)$^a$ | 14 (Xe/Kr) |
| $CO_2$ | 5 | 1.2 | 3 (Xe/$CO_2$) |
| $N_2$ | 0.08 | 47 | 209 (Xe/$N_2$) |
| Ar | 0.08 | 5.28 | 210 (Xe/Ar) |
| $O_2$ | 0.08 | 12 | 206 (Xe/$O_2$) |

Co-adsorption of various gases calculated at the breakthrough point from a column containing CaSDB at room temperature. The capacity and selectivity were calculated from 20 ml/min data.
$^a$Capacity at equilibrium

TABLE 4

| Gas | Breakthrough Time (min) | Capacity (mmol/kg) | Selectivity of Xenon |
|---|---|---|---|
| Xe | 15.5 | 21 (68)$^a$ | |
| Kr | 1.5 | 0.2 (1.7)$^a$ | 10.6 (Xe/Kr) |
| $CO_2$ | 38 | 12.27 | 0.45 (Xe/$CO_2$) |
| $N_2$ | 0.16 | 142 | 93 (Xe/$N_2$) |
| Ar | 0.16 | 15.9 | 96 (Xe/Ar) |
| $O_2$ | 0.16 | 36.16 | 91 (Xe/$O_2$) |

$^a$Capacity at equilibrium, Co-adsorption of various gases calculated at the breakthrough point (unless otherwise specified) from a column containing CuATC at room temperature. Below capacity and selectivity were calculated only from 20 ml/min data.

TABLE 5

| Gas | Breakthrough Time (min) | Capacity (mmol/kg) | Selectivity of Kr |
|---|---|---|---|
| Kr | 2.5 | 0.13 | |
| $CO_2$ | 7.5 | 0.90 | 0.3 (Kr/$CO_2$) |
| $N_2$ | 0.25 | 80.8 | 9.9 (Kr/$N_2$) |
| Ar | 0.25 | 9.09 | 9.3 (Kr/Ar) |
| $O_2$ | 0.25 | 21.2 | 9.3 (Kr/$O_2$) |

Co-adsorption of various gases calculated at the breakthrough point from single column breakthrough experiments containing CaSDB at room temperature with a gas mixture consisting of 130 ppm Kr, 78.2% $N_2$, 21% $O_2$, 0.9 Ar, and 300 ppm $CO_2$ with a flow rate of 10 ml/min.

TABLE 6

| | PCN-12 | CuBTC | MOF-74Ni |
|---|---|---|---|
| BET S.A ($m^2$/g) | 2700 | 2000 | 1423 |
| Pore Volume (cc/g) | 1.32 | 0.85 | 0.48 |
| Xe uptake at 298K (cc/g) | 114 | 96 | 95 |
| Xe uptake at 195K (cc/g) | 480 | 403 | 200 |
| Density of Xe in the pores at 298K (g/cc) | 0.50 | 0.66 | 1.15 |
| Density of Xe in the pores at 195K (g/cc) | 2.12 | 2.77 | 2.4 |

Figure 6A:
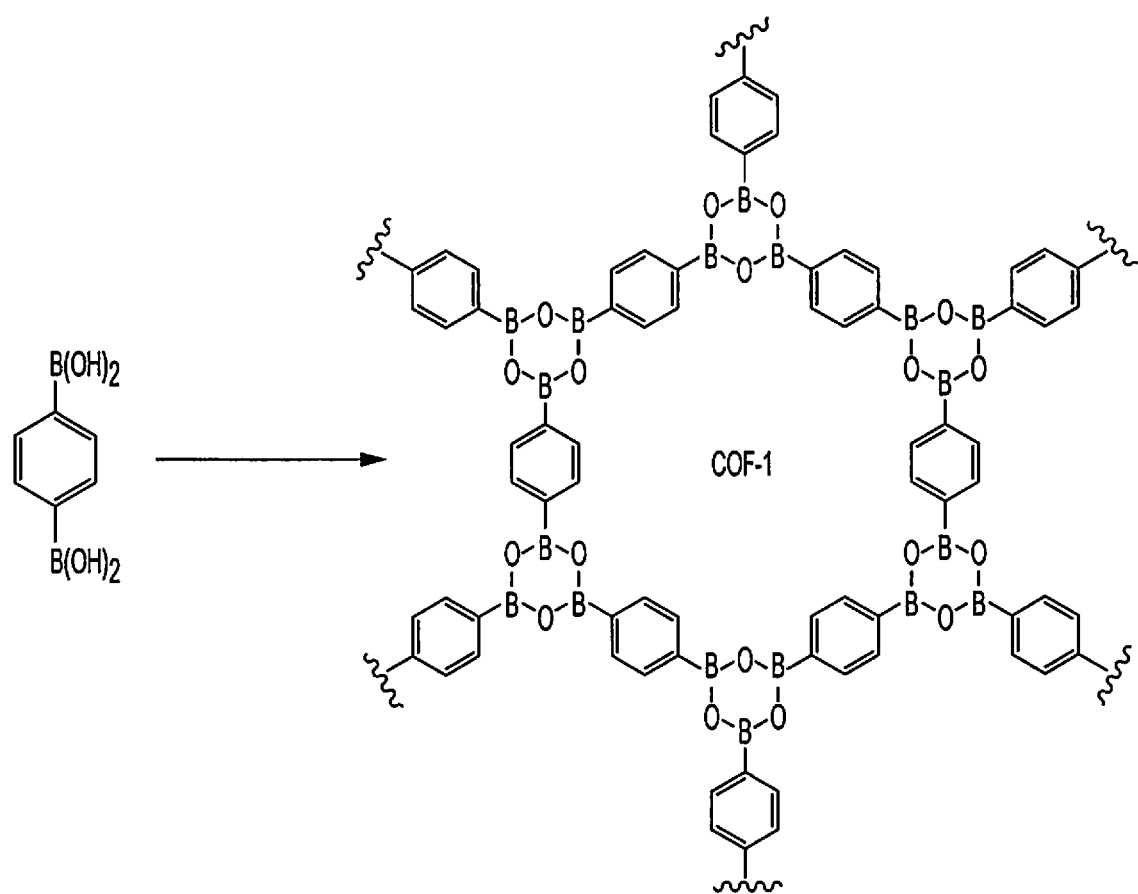
FIG. 6A-6R show the structures of a variety of covalent organic framework materials and porous organic frameworks (POFs) that have demonstrated significant utility as gas capture materials for preselected applications.
Figure 6B:
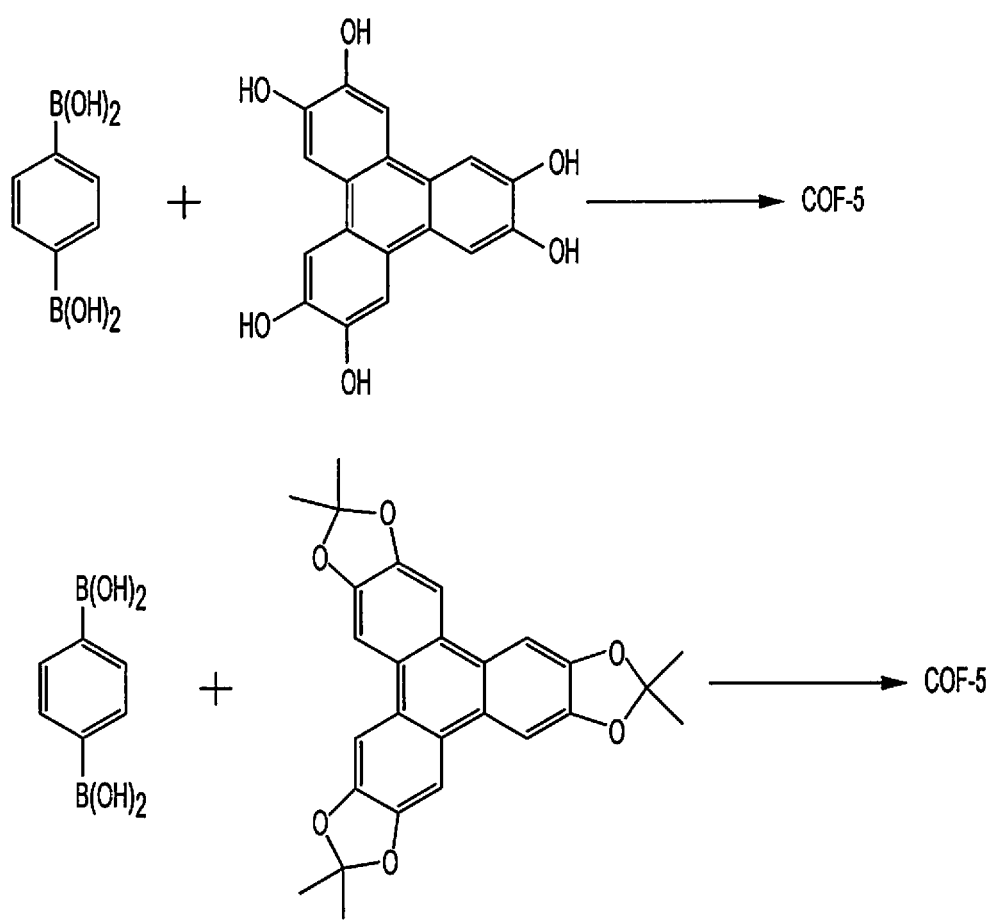
Figure 6C:
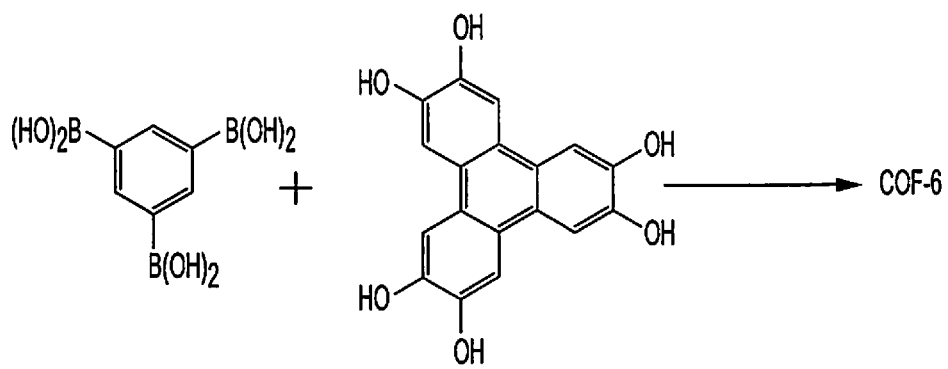
Figure 6D:
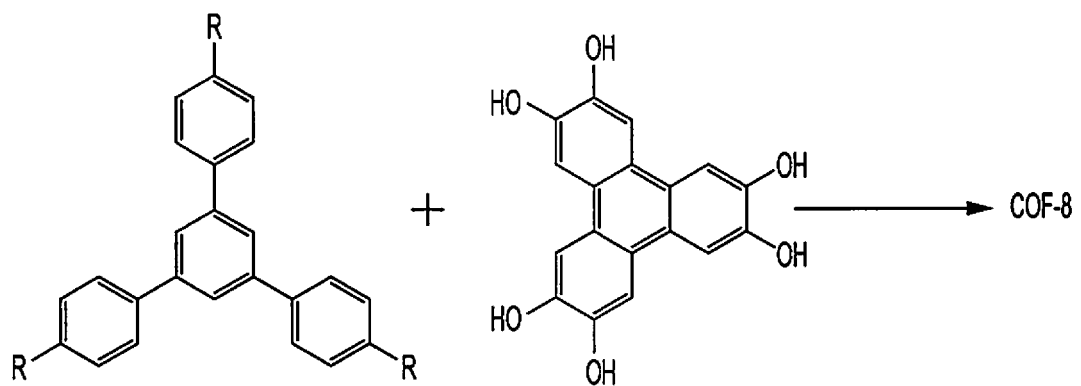
Figure 6E:
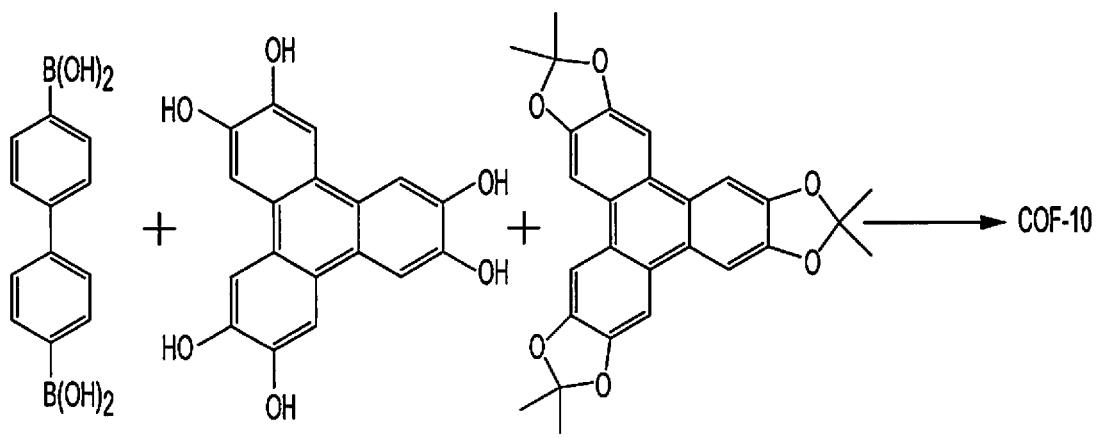
Figure 6F:
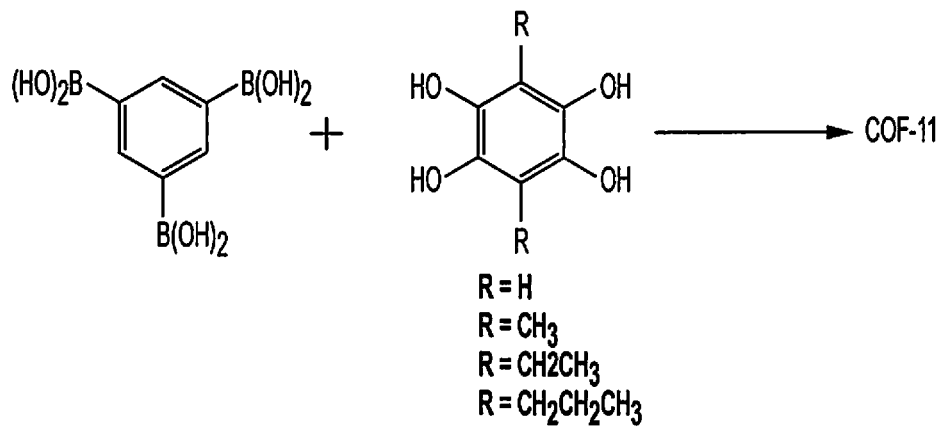
Figure 6G:
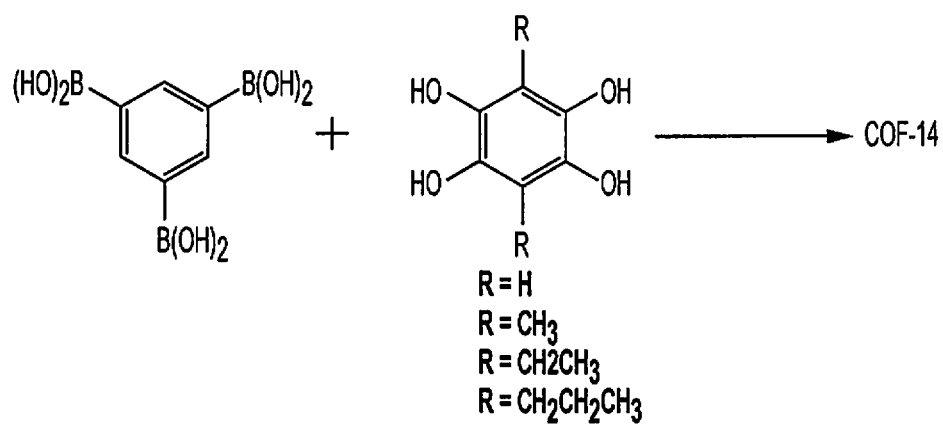
Figure 6H:
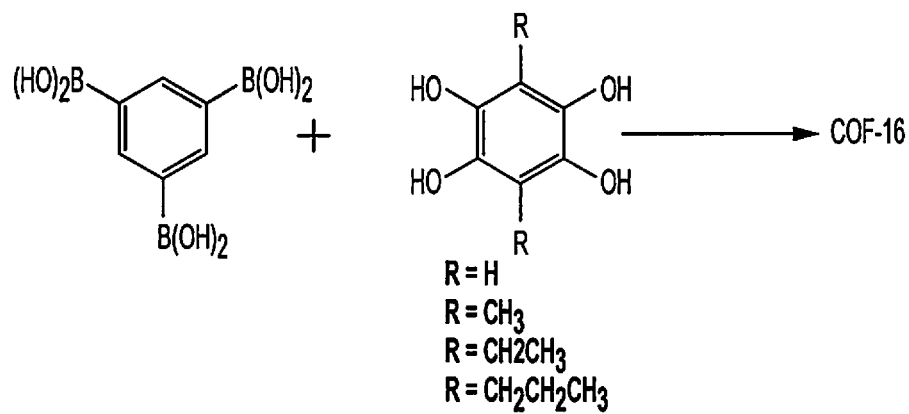
Figure 6I:
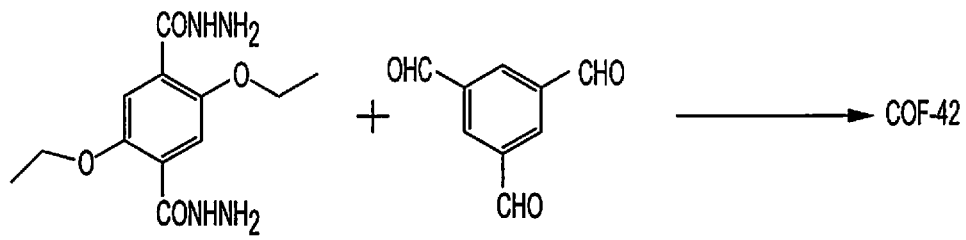
Figure 6J:
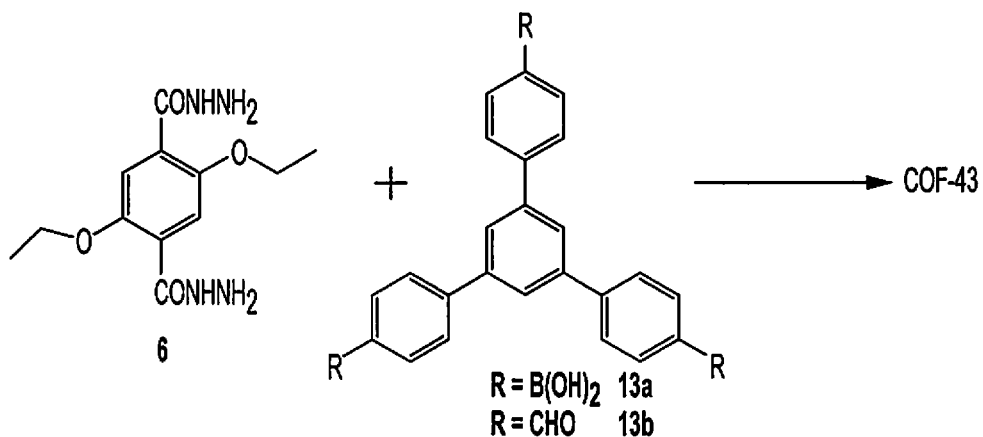
Figure 6K:
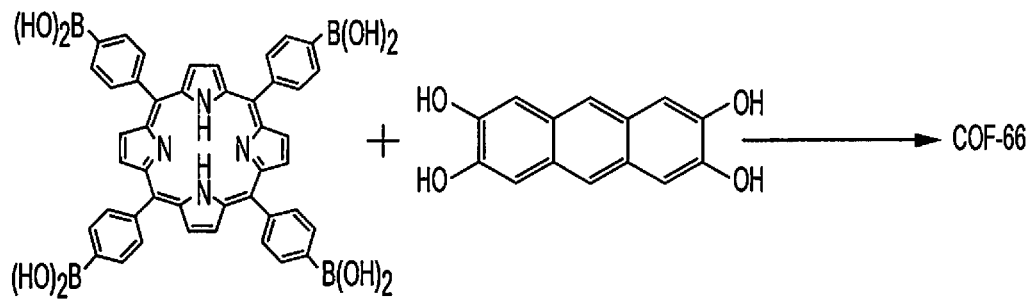
Figure 6L:
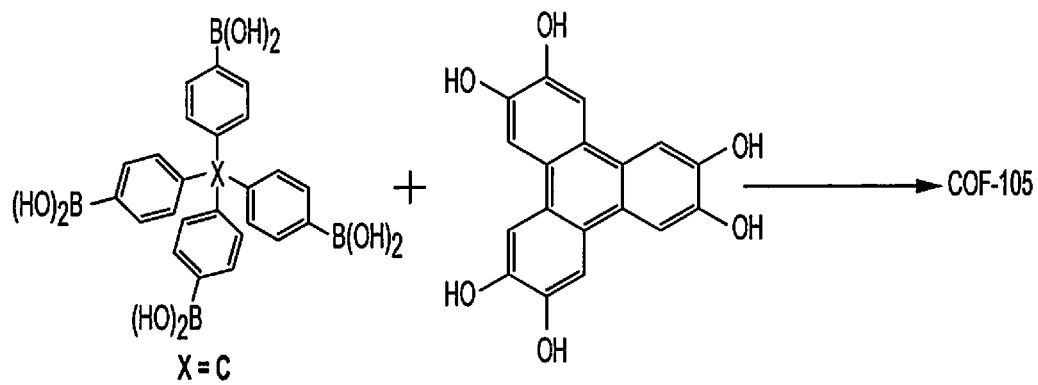
Figure 6M:
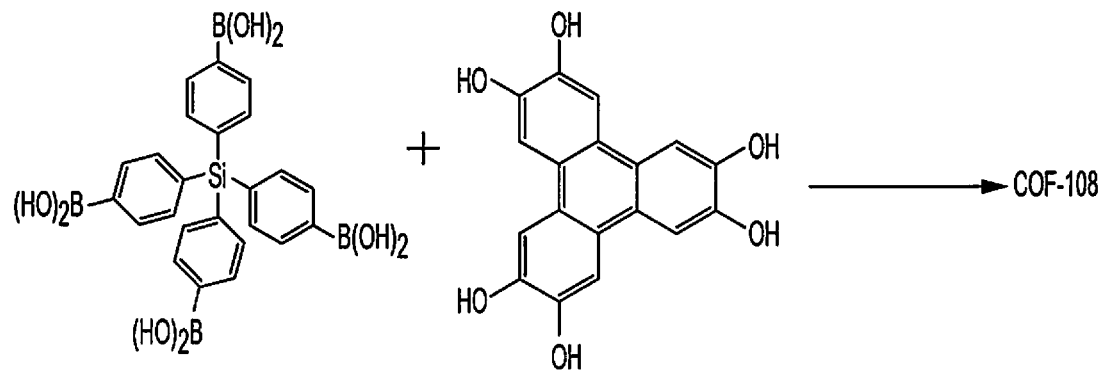
Figure 6N:
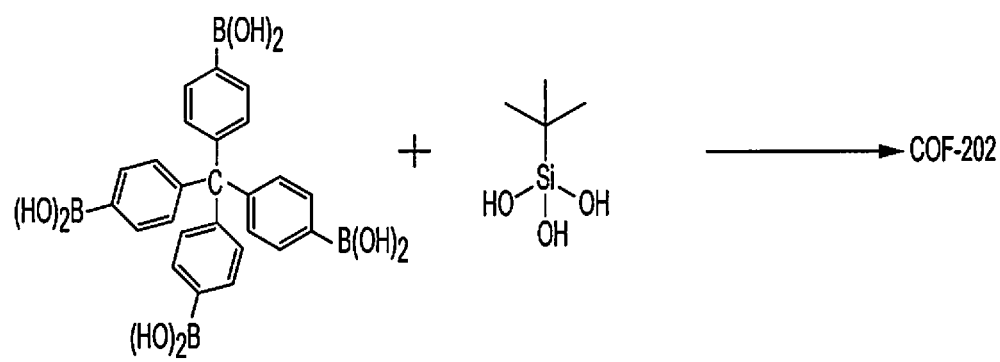
Figure 6O:
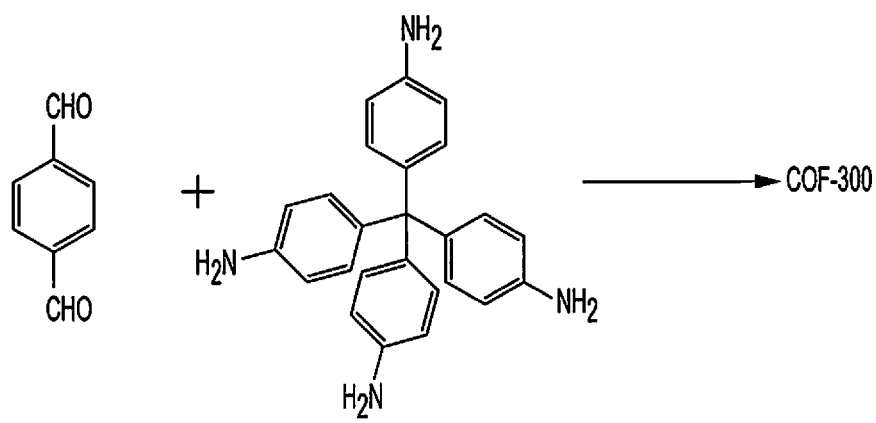
Figure 6P:
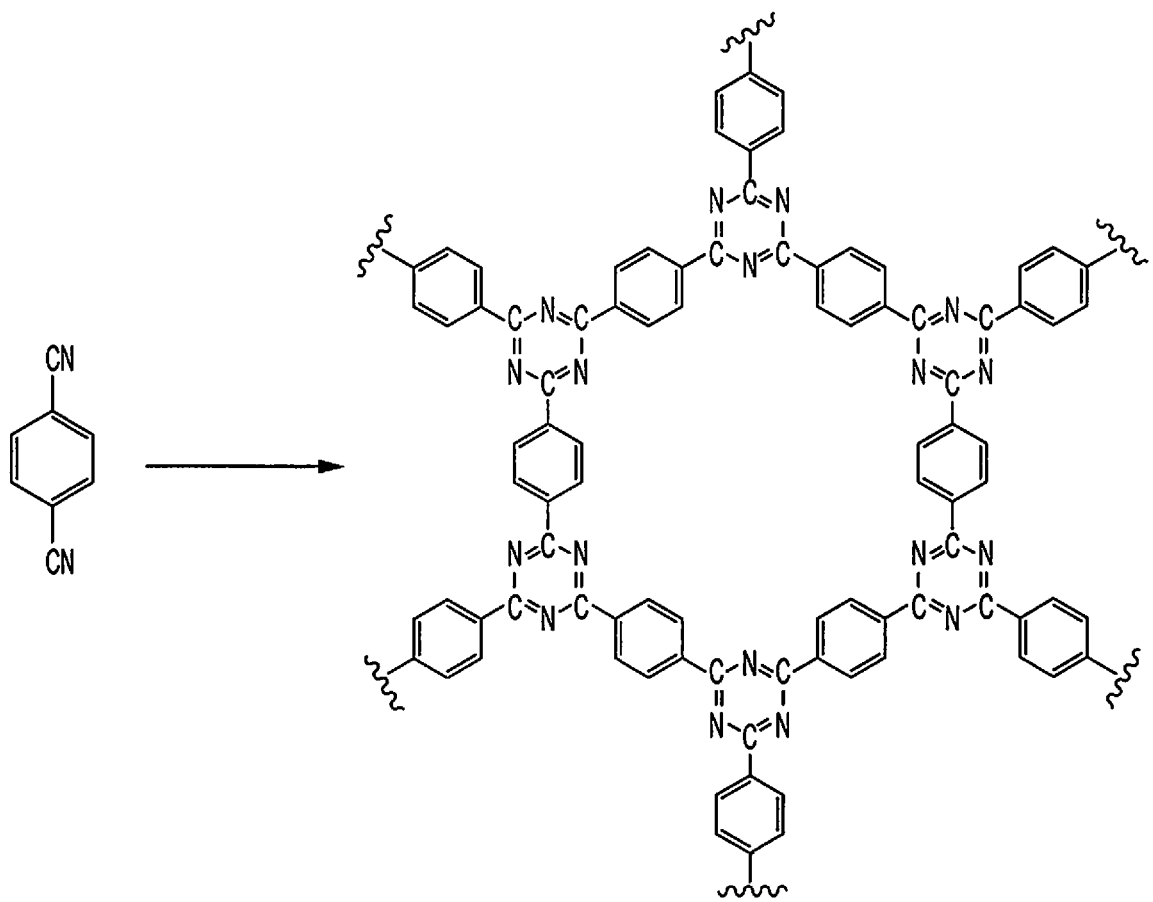
Figure 6Q:
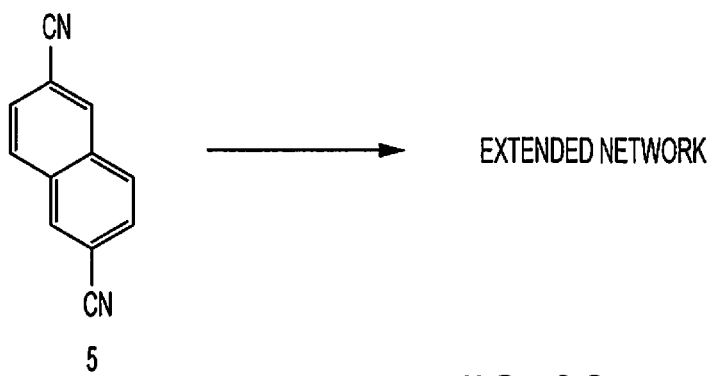
Figure 6R:
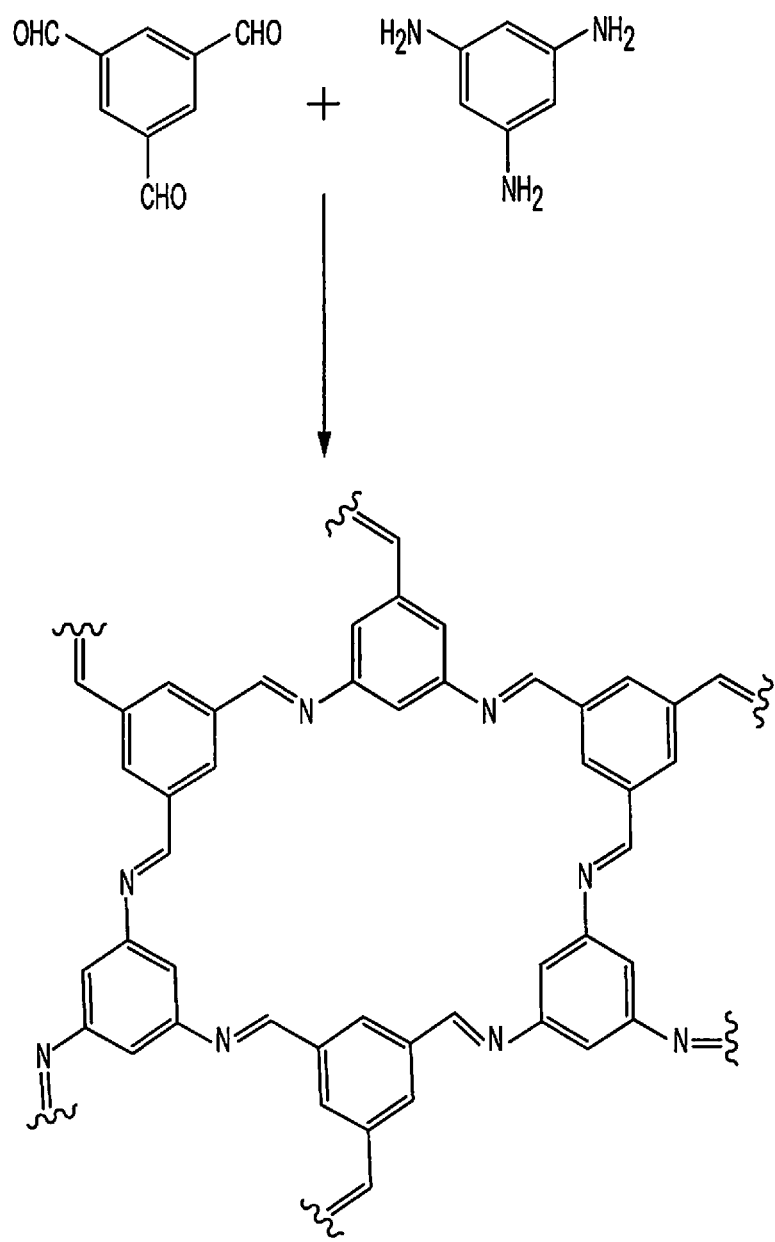

In another embodiment of the present invention, the sorbent comprises covalent organic frameworks, such as those shown in FIG. 6A-6R. Covalent organic frameworks (COFs) or porous organic frameworks (POFs) or porous polymer networks (PPNs) are porous crystalline extended aromatic framework materials where the organic building blocks are linked by strong covalent bonds. The attractiveness behind these materials was exclusively the use of light elements such as H, B, C, N and O which are known to form well established materials (ex: graphite, diamond, boron nitride etc) with strong covalent bonds. The fine tunability of the organic building block with various functional groups, extending the size, lead to the formation of lightweight functionalized micro/meso porous covalent frameworks with desired applications.

In one embodiment of the present invention covalent organic framework type materials, including, but not limited to those generated by condensation of diboronic acid, hexahydroxytriphenylene, dicyanobenzene and its derivatives of chemical formula $C_9H_4BO_2$ and so on, and those generated from benzene-1,4-diboronic acid (BDBA), 2,3,6,7,10,11-hexahydroxyltriphenylene (HHTP), tetrakis(4-bromophenyl)methane, Tetrakis(4-ethynylphenyl)methane (TEPM), 1,3,5,7-Tetrakis(4-ethynylphenyl)adamantine (TEPA), 1,3,5,7-Tetrakis(4-bromophenyl)adamantine (TBPA). In preferred embodiment of the present invention, the covalent organic framework (COF) derived from benzene-1,4-diboronic acid and extended likers.

In an embodiment of the present invention, the moderate to high surface area COFs with pore size between 0.35 to 6 nm in pore size or higher may be produced from condensation one or more compounds containing diboronic acid, di-, tri-cyano benzenes, or di-tri-amino benzenes with di or ti-aldehydes and combination thereof listed in FIG. 6A-6R. In another embodiment of the present invention, the COFs are selected from the group consisting of COF-1, FIG. 6A, COF-5, FIG. 6B, COF,-6, FIG. 6C, COF-8, FIG. 6D, COF-10, FIG. 6E, COF-11, FIG. 6F, COF-14, FIG. 6G, COF-16, FIG. 6H, and mixtures thereof. COF-8, FIG. 6D, COF-10, FIG. 6E, and COF-16, FIG. 6H, COF-42, FIG. 6I, COF-43, FIG. 6J, COF-66, FIG. 6K, COF-105, FIG. 6L, COF-108, FIG. 6M, COF-202, FIG. 6N, COF-300, FIG. 6O may be produced using combination of di, tri-boronic acid and alcohols.

In an embodiment of the present invention, the moderate to high surface area COFs with pore size between 0.35 to 6 nm in pore size or higher may be produced from trimerization of functionalized dicyano or tricyano functionalized organic building blocks or COFs generated from condensation of aldehyde and imine groups. For example, the present invention, the COFs generated from dicyano benzene derivatives shown in FIG. 6P, 6Q and condensation of di-, tri- or tetra-amino functionalized organic building blocks and di- or tri-aldehyde functionalized organic molecules or combination thereof to generate COFs shown in FIG. 6R.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A method for capturing a preselected target material gas from a mixed stream comprising the steps of:
    passing at least a portion of a mixed stream over a capture material containing a material selected from the group consisting of M-ATC, MPyCar, M-SDB, CROFOUR-1-Ni, CROFOUR-2-Ni, PCN-12, MOF-74 series, porous organic cage compounds, and SIFSIX derivatives, wherein the pre-selected target material is Tritium.

2. The method of claim 1 wherein the preselected target material includes Xe.

3. The method of claim 1 wherein the preselected target material includes Kr.

4. The method of claim 1 wherein the preselected target material includes Rn.

5. The method of claim 1 wherein the preselected target material includes Ar.

6. The method of claim 1 wherein the preselected target materials includes a noble gas.

7. The method of claim 1 wherein the pre-selected target material includes Iodine.

8. The method of claim 1 wherein the mixed stream is an anaesthetic gas mixture containing Xe.

9. The method of claim 1 wherein the mixed stream is an anaesthetic gas mixture containing nitrous oxide.

10. The method of claim 1 wherein the mixed stream is an anaesthetic gas mixture containing at least one material selected from the group consisting of isoflurane, sevoflurane, fluorinated ethers and combinations thereof.

11. The method of claim 1 wherein the mixed stream is an off-gas from semiconductor/microelectronic manufacturing.

12. The method of claim 1 wherein the preselected target material includes a radioactive isotope.

13. The method of claim 1 wherein the mixed stream is an off gas from isotope production.

14. The method of claim 1 wherein the mixed stream is a gas.

15. The method of claim 14 wherein the gas is air.

16. The method of claim 1 wherein the mixed stream is a liquid.

17. The method of claim 16 wherein the liquid is aqueous.

18. The method of claim 17 wherein the preselected target material includes Iodine, methyl iodide or derivatives therefrom.

19. The method of claim 1 wherein the method further comprises the step of passing the mixed stream over a first bed comprising a metal organic framework (MOF) material having an interconnected pore size ranging from 0.35 nm to 0.2 nm selected from the group consisting of M-ATC, M-PyCar, M-SDB, CROFOUR-1-Ni, CROFOUR-2-Ni, PCN-12, M-TCPB and M-hfbba, to generate a filtered gas and then passing said filtered gas over a second bed having a metal organic framework (MOF) material.

* * * * *